US011770001B2

(12) United States Patent
Tsujii et al.

(10) Patent No.: US 11,770,001 B2
(45) Date of Patent: Sep. 26, 2023

(54) STABILITY MONITORING DEVICE AND METHOD

(71) Applicant: HITACHI, LTD., Tokyo (JP)

(72) Inventors: Yuki Tsujii, Tokyo (JP); Masahiro Watanabe, Tokyo (JP); Masachika Nakatani, Tokyo (JP); Ryousuke Nakamura, Tokyo (JP); Masataka Imabayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1365 days.

(21) Appl. No.: 16/098,399

(22) PCT Filed: Jun. 27, 2017

(86) PCT No.: PCT/JP2017/023503
§ 371 (c)(1),
(2) Date: Nov. 1, 2018

(87) PCT Pub. No.: WO2018/020933
PCT Pub. Date: Feb. 1, 2018

(65) Prior Publication Data
US 2023/0155385 A1    May 18, 2023

(30) Foreign Application Priority Data

Jul. 27, 2016  (JP) .................... 2016-146879

(51) Int. Cl.
*H02J 3/00* (2006.01)
*H02J 3/24* (2006.01)
(Continued)

(52) U.S. Cl.
CPC .............. *H02J 3/00* (2013.01); *G05B 19/042* (2013.01); *H02J 3/001* (2020.01); *H02J 3/24* (2013.01);
(Continued)

(58) Field of Classification Search
CPC ........ H02J 3/24; H02J 3/001; H02J 13/00002; G05B 19/042; G05B 2219/2639
See application file for complete search history.

(56) References Cited

U.S. PATENT DOCUMENTS

2002/0198632 A1* 12/2002 Breed ..................... G01S 17/86
701/472
2004/0236494 A1* 11/2004 DeBotton ............. G01M 15/12
701/111
(Continued)

FOREIGN PATENT DOCUMENTS

JP    2007-181387 A    7/2007
JP    2007-288878 A    11/2007

*Primary Examiner* — Ziaul Karim
(74) *Attorney, Agent, or Firm* — Volpe Koenig

(57) ABSTRACT

A power system stability monitoring device comprising: a simple stability calculation unit that calculates the angular velocity and internal phase angle of a generator in each fault case based on fault conditions and the system configuration of the power system; a severity indicator calculation unit that calculates a severity indicator that represents the degree of system instability based on the angular velocity and internal phase angle; a PCS power supply severe parallel-off condition extracting unit that calculates a PCS power supply parallel-off severity indicator based on a parallel-off sensitivity indicator representing a degree of influence of PCS power supply parallel-off on the degree of instability and the severity indicator, and that extracts fault cases where the parallel-off severity indicator exceeds a prescribed threshold; and a detailed stability calculation unit that performs a detailed stability calculation for each extracted fault case based on the severity indicator or parallel-off severity indicator.

10 Claims, 28 Drawing Sheets

(51) Int. Cl.
*H02J 13/00* (2006.01)
*G05B 19/042* (2006.01)

(52) U.S. Cl.
CPC ........ *H02J 13/00* (2013.01); *H02J 13/00002* (2020.01); *G05B 2219/2639* (2013.01)

(56) References Cited

U.S. PATENT DOCUMENTS

| | | | | |
|---|---|---|---|---|
| 2007/0005202 A1* | 1/2007 | Breed | ................... | G07C 5/0808 |
| | | | | 714/25 |
| 2016/0084889 A1* | 3/2016 | Mezic | ...................... | G05F 1/66 |
| | | | | 702/60 |
| 2017/0181672 A1* | 6/2017 | Nogueira | ............. | A61B 5/6849 |
| 2017/0181676 A1* | 6/2017 | Nogueira | ........... | A61B 5/14532 |
| 2019/0050015 A1* | 2/2019 | Mezic | ............... | H02J 13/00001 |

* cited by examiner

FIG. 4

| RANKING | FAULT POINT | SEVERITY INDICATOR x |
|---|---|---|
| 1 | A | 1.5 |
| 2 | B | 1.0 |
| 3 | C | 0.6 |
| 4 | D | 0.4 |
| 5 | E | 0.2 |
| ... | | |

FIG. 5

| RANKING | FAULT POINT | PRESENCE/ABSENCE OF PARALLEL-OFF OF PCS POWER SUPPLY | | | | | SEVERITY INDICATOR x |
|---|---|---|---|---|---|---|---|
| | | P1 | P2 | P3 | P4 | ... | |
| 1 | A | ○ | × | ○ | × | | 2.0 |
| 2 | B | ○ | × | × | × | | 1.8 |
| 3 | A | × | × | ○ | × | | 1.6 |
| 4 | B | ○ | ○ | ○ | × | | 1.4 |
| 5 | C | ○ | × | ○ | ○ | | 0.8 |
| ... | | | | | | | |

PRESENCE OF PARALLEL-OFF : ○, ABSENCE OF PARALLEL-OFF : ×

FIG. 6

| RANKING | FAULT POINT | PRESENCE/ABSENCE OF PARALLEL-OFF OF PCS POWER SUPPLY | | | | | SIMPLE STABILITY CALCULATION | DETAILED STABILITY CALCULATION ※ | |
|---|---|---|---|---|---|---|---|---|---|
| | | P1 | P2 | P3 | P4 | ... | SEVERITY INDICATOR x | TIME UNTIL STEP-OUT [s] | MAXIMUM INTERNAL PHASE ANGLE DIFFERENCE [DEGREES] |
| 1 | A | ○ | × | ○ | × | | 2.0 | 0.70 | — |
| 2 | B | ○ | × | × | × | | 1.8 | 0.73 | — |
| 3 | A | × | × | ○ | × | | 1.6 | 0.78 | — |
| 4 | B | ○ | ○ | ○ | × | | 1.4 | 0.83 | — |
| 5 | C | ○ | × | ○ | ○ | | 0.8 | NO STEP-OUT | 95.0 |
| ... | | | | | | | | | |

PRESENCE OF PARALLEL-OFF : ○, ABSENCE OF PARALLEL-OFF : ×

※ IF GENERATOR STEPS OUT, CONDITION IS MORE SEVERE AS TIME UNTIL STEP-OUT IS SHORTER. IF GENERATOR DOES NOT STEP OUT, CONDITION IS MORE SEVERE AS MAXIMUM INTERNAL PHASE ANGLE DIFFERENCE IS GREATER.

FIG. 12

FIRST EMBODIMENT

| RANKING | PRESENCE/ABSENCE OF PARALLEL-OFF OF PCS POWER SUPPLY | | | PARALLEL-OFF SEVERITY INDICATOR w |
|---|---|---|---|---|
| | P1 | P2 | P3 | |
| 1 | ○ | × | ○ | 1.38 |
| 2 | ○ | × | × | 1.22 |
| 3 | × | × | × | 1.18 |
| 4 | × | ○ | ○ | 1.06 |
| 5 | × | ○ | × | 1.02 |
| 6 | × | × | ○ | 0.88 |
| 7 | ○ | ○ | ○ | 0.76 |
| 8 | ○ | ○ | × | 0.72 |

PRESENCE OF PARALLEL-OFF : ○, ABSENCE OF PARALLEL-OFF : ×

FIG. 13

KNOWN EXAMPLES

PRESENCE/ABSENCE OF
PARALLEL-OFF OF
PCS POWER SUPPLY

| P1 | P2 | P3 |
|----|----|----|
| O  | ×  | O  |
| O  | ×  | ×  |
| ×  | ×  | ×  |
| ×  | O  | O  |
| ×  | O  | ×  |
| ×  | ×  | O  |
| O  | O  | O  |
| O  | O  | ×  |

PRESENCE OF PARALLEL-OFF : O,   ABSENCE OF PARALLEL-OFF : ×

FIG. 17

SECOND EMBODIMENT

| RANKING | PRESENCE/ABSENCE OF PARALLEL-OFF OF PCS POWER SUPPLY | | | PARALLEL-OFF SEVERITY INDICATOR w |
|---|---|---|---|---|
| | P1 | P2 | P3 | |
| 1 | ○ | × | ○ | 1.38 |
| 2 | ○ | × | × | 1.22 |
| 3 | × | × | × | 1.18 |
| 4 | × | ○ | ○ | 1.06 |
| 5 | × | ○ | × | 1.02 |
| 6 | × | × | ○ | 0.88 |
| 7 | ○ | ○ | ○ | 0.76 |
| 8 | ○ | ○ | × | 0.72 |

PRESENCE OF PARALLEL-OFF : ○, ABSENCE OF PARALLEL-OFF : ×

FIG. 22

THIRD EMBODIMENT

| RANKING | PRESENCE/ABSENCE OF PARALLEL-OFF OF PCS POWER SUPPLY | | | PARALLEL-OFF SEVERITY INDICATOR w |
| --- | --- | --- | --- | --- |
| | P1 | P2 | P3 | |
| 1 | ○ | × | ○ | 1.38 |
| 2 | ○ | × | × | 1.22 |
| 3 | × | × | × | 1.18 |
| 4 | × | ○ | ○ | 1.06 |
| 5 | × | ○ | × | 1.02 |
| 6 | × | × | ○ | 0.88 |
| 7 | ○ | ○ | ○ | 0.76 |
| 8 | ○ | ○ | × | 0.72 |

PRESENCE OF PARALLEL-OFF : ○,
ABSENCE OF PARALLEL-OFF : ×

FIG. 26

FIRST EMBODIMENT

| RAN-KING | PRESENCE/ABSENCE OF PARALLEL-OFF OF PCS POWER SUPPLY | | | PARALLEL-OFF SEVERITY INDICATOR w | SEVERITY INDICATOR x |
|---|---|---|---|---|---|
| | P1 | P2 | P3 | | |
| 1 | O | X | O | 1.38 | 1.40 |
| 2 | O | X | X | 1.22 | 1.30 |
| 3 | X | X | X | 1.18 | 1.20 |
| 4 | X | O | O | 1.06 | 1.10 |
| 5 | X | O | X | 1.02 | 1.00 |
| 6 | X | X | O | 0.88 | 0.90 |
| 7 | O | O | O | 0.76 | 0.80 |
| 8 | O | O | X | 0.72 | 0.70 |

Rankings 1–5: PCS POWER SUPPLY PARALLEL-OFF PATTERN IN WHICH DETAILED STABILITY IS ANALYZED
Rankings 6–8: PCS POWER SUPPLY PARALLEL-OFF PATTERN IN WHICH DETAILED STABILITY IS NOT ANALYZED

PRESENCE OF PARALLEL-OFF: O, ABSENCE OF PARALLEL-OFF: X

FOURTH EMBODIMENT

| RAN-KING | PRESENCE/ABSENCE OF PARALLEL-OFF OF PCS POWER SUPPLY | | | PARALLEL-OFF SEVERITY INDICATOR w |
|---|---|---|---|---|
| | P1 | P2 | P3 | |
| 1 | O | X | O | 1.40 |
| 2 | O | X | X | 1.30 |
| 3 | X | O | X | 1.20 |
| 4 | X | O | O | 1.10 |
| 5 | X | X | O | 1.00 |
| 6 | O | O | O | 0.90 |
| 7 | O | O | O | 0.80 |
| 8 | O | O | X | 0.70 |

Rankings 1–8 (bracketed): PCS POWER SUPPLY PARALLEL-OFF PATTERN IN WHICH DETAILED STABILITY IS NOT ANALYZED

PRESENCE OF PARALLEL-OFF: O, ABSENCE OF PARALLEL-OFF: X

OUTPUT CHANGE ASSOCIATED WITH
PARALLEL-OFF OF PCS POWER SUPPLY [MW]

OUTPUT CHANGE ASSOCIATED WITH
PARALLEL-OFF OF PCS POWER SUPPLY A [MW]

FIG. 31

| RANKING | FAULT POINT | PRESENCE/ABSENCE OF PARALLEL-OFF AND RECONNECTION OF PCS POWER SUPPLY/TIME | | | | | SEVERITY INDICATOR x |
|---|---|---|---|---|---|---|---|
| | | P1 | | | | ... | |
| | | PARALLEL-OFF | TIME | RECONNECTION | TIME | | |
| 1 | A | ○ | 0.50 | ○ | 1.50 | | 2.0 |
| 2 | B | ○ | 0.50 | × | — | | 1.8 |
| 3 | A | × | — | ○ | 1.50 | | 1.6 |
| 4 | B | ○ | 0.50 | ○ | 1.50 | | 1.4 |
| 5 | C | ○ | 0.50 | ○ | 1.50 | | 0.8 |
| ... | | | | | | | |

PRESENCE OF PARALLEL-OFF AND RECONNECTION : ○, ABSENCE OF PARALLEL-OFF : ×

STABILITY MONITORING DEVICE AND METHOD

TECHNICAL FIELD

The present invention relates to a stability monitoring device and a method for determining a transient stability of a power system.

BACKGROUND ART

When a fault occurs in a power system due to lightning strikes or the like, rotation is accelerated with respect to other generators in some rotator-type generators. The internal phase angle of the accelerated generator with respect to a reference generator becomes larger than those of other generators, and thus synchronization between generators cannot be maintained. This phenomenon is called deterioration of transient stability. If the accelerated generator is not separated from the system, the number of accelerated generators increases, and the accelerated generators are stopped for protection. If the phenomenon occurs consecutively, in the worst case, a massive blackout may occur.

In order to prevent a massive blackout, a stability monitoring device (NPL 1) has been developed. This system prevents degradation of synchronous stability at the time of a fault by combining a pre-fault (preliminary) operation implemented by a stability monitoring device and post-fault (posterior) operation implemented by an electric control device. In the preliminary operation, stability is analyzed for all assumed fault cases from online measurement information, and a generator to be separated from the system is determined in advance for each case. Since the online measurement information is updated at a regular period, it is necessary to finish analyzing stability of all assumed fault cases within the above period. In the posterior operation, when a system fault occurs, a generator shutdown command is received, and a generator or a load is shut down.

In a preliminary operation, a stability analysis is performed on a large number of locations in both a fundamental system and a power supply system, with fault monitoring points as a power transmission line, a bus, and a transformer. In order to calculate multiple fault modes for one fault monitoring point, it is necessary to analyze a huge number of cases, e.g., hundreds of cases. During an operation for one case, stability is determined by simulation for about 10 seconds after occurrence of a fault with increments of about 10 milliseconds. This calculation is referred to as a detailed stability calculation. Since the calculation time for a detailed stability calculation is long, the stability of all fault cases within a period for collecting online measurement information cannot be determined.

Based on the above background, there is proposed a stability monitoring device capable of shortening the calculation period for determining a transient stability by performing the detailed stability calculation only for fault cases with high severities, based on the severity of each fault case calculated through the simple stability calculation shown below, instead of the detailed stability calculation for all fault cases. The severity represents a degree at which it becomes difficult for each generator to keep a constant internal phase angle and maintain synchronous rotation against disturbance due to a fault. The shorter the time until a generator steps out is or the greater the variation of the internal phase angle of a generator is, the greater the severity becomes.

An example of a simple stability calculation for narrowing down fault cases is described below.

In the technical field, there is JP-A-2007-288878 (PTL 1). The document discloses that, in order to perform a calculation for each assumed fault, a short time phenomenon after occurrence of a fault is state-simulated to obtain a severity indicator value of a power system calculated from angular velocities or internal phase angles of a plurality of generators, thereby determining whether the power system is stable or unstable within a short time.

Also, there is JP-A-2007-181387 (PTL 2). In this document, it is disclosed that stability determination results, such as stability determination and quantitative evaluation of stability, can be obtained through an extended equal area criterion.

CITATION LIST

Patent Literature

PTL 1: JP-A-2007-288878
PTL 2: JP-A-2007-181387

Non-Patent Literature

NPL 1: Hiroji Ota, Toshihiro Inoue, Hisanori Ito, Nobuo Fukushima, Kazuya Omata, Kenichi Morita, Yutaka Kokai: "Development of Transient Stability Controller System (TSC) Based on on-line stability calculation", Theory of electron B, Vol. 115, No. 1, 1995

NPL 2: Japan Electric Association Grid-interconnection Special Group: "Grid-interconnection Code JEAC 9701-2012", 2012

SUMMARY OF INVENTION

Technical Problem

In conventional stability monitoring devices disclosed in PTL 1 and PTL 2, a severity indicator of a system is obtained through a simple stability calculation, and, by allocating rankings to severities of fault cases that become unstable based on the magnitude of indicator values, the number of fault cases for a detailed stability calculation is narrowed down.

However, in the above-mentioned stability monitoring device, the influence of paralleling off the distributed power supply (hereinafter referred to as "PCS power supply") equipped with a PCS such as a wind turbine generator by voltage reduction and frequency drop (Non-Patent Document 2) is not assumed. Therefore, as the number of PCS power supplies is increased, the number of fault cases becomes enormous. Specifically, when the number of PCS power supplies is increased by N, two cases including parallel-off or continuous operation of each PCS power supply are assumed, and thus the number of fault cases increases by the multiples of $2^N$. Therefore, it takes a huge amount of time to allocate rankings through a simple stability calculation, and thus the overall calculation period increases. When the calculation period increases, a control based on latest system information can not be performed, and thus an excessive power supply restriction or the like becomes necessary in consideration of a margin.

Solution to Problem

In order to solve the above problem, the present invention provides a device for monitoring stability of a power system, the device including a simple stability calculation unit that calculates an angular velocity and an internal phase angle of a generator in each fault case based on fault conditions and a system configuration of the power system; a severity indicator calculation unit that calculates a severity indicator representing a degree of system instability based on the angular velocity and the internal phase angle of the generator; a PCS power supply severe parallel-off condition extracting unit that calculates a parallel-off severity indicator of a PCS power supply based on a parallel-off sensitivity indicator representing a degree of influence of parallel-off of the PCS power supply on a degree of instability of a generator and the severity indicator, and that extracts fault cases corresponding to the parallel-off severity indicator exceeding a prescribed threshold; and a detailed stability calculation unit that performs a detailed stability calculation for each extracted fault case based on the severity indicator or the parallel-off severity indicator.

Advantageous Effects of Invention

According to the present invention, by shortening a calculation period by narrowing down the number of fault cases to combinations of parallel-offs and continuous operations of a PCS power supply with which stability becomes severe, a control based on the latest system information can be performed and excessive power supply restriction or load restriction can be prevented.

BRIEF DESCRIPTION OF DRAWINGS

FIG. 4 is a diagram showing an example of rankings of severity indicators in a case where PCS power supply parallel-off in a simple stability calculation is not taken into account.

FIG. 5 is a diagram showing an example of rankings of severity indicators in a case where PCS power supply parallel-off in a simple stability calculation is taken into account.

FIG. 6 is a diagram showing an example of severity indicator rankings calculated through simple stability calculations and times until step-out and maximum internal phase angle differences calculated through detailed stability calculations.

FIG. 12 is a diagram showing an example of a PCS power supply pattern for allocating rankings through a simple stability calculation according to a first embodiment.

FIG. 13 is a diagram showing an example of a result of performing a detailed stability calculation according to a known example.

FIG. 17 is a diagram showing an example of a PCS power supply pattern for allocating rankings through a simple stability calculation according to a second embodiment.

FIG. 22 is a diagram showing an example of a PCS power supply pattern for allocating rankings through a simple stability calculation according to a third embodiment.

FIG. 26 is a diagram showing an example of severity indicator rankings for performing detailed stability calculations in the first embodiment and a fourth embodiment.

FIG. 31 is a diagram showing an example of rankings of severity indicators in a case where PCS power supply parallel-off in a simple stability calculation is taken into account.

DESCRIPTION OF EMBODIMENTS

Suitable embodiments for carrying out the present invention will be described below. The following is merely an example of implementation, and it is not intended to limit the present invention to the specific contents below.

First Embodiment

Embodiments of the present invention will be described below.

Figure 1:
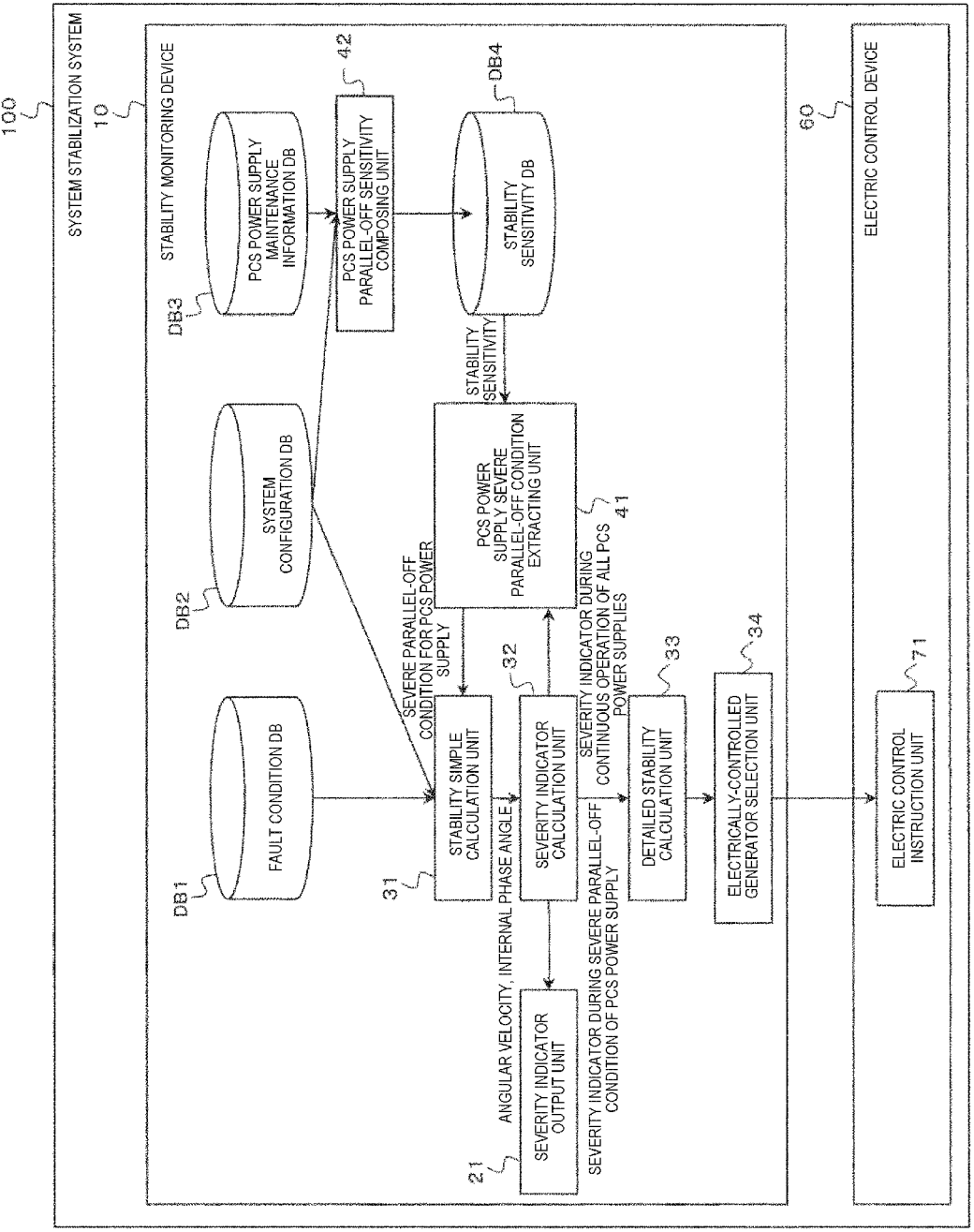
FIG. 1 is a diagram showing an example of a software configuration of a stability monitoring device.

FIG. 1 is a diagram showing an example of a software configuration of a stability monitoring device 10 to which an embodiment of the present invention is applied. The stability monitoring device 10 includes a fault condition database DB1, a system configuration database DB2, a PCS power supply maintenance information database DB3, a severity indicator output unit 21, a simple stability calculation unit 31, a severity indicator calculation unit 32, a detailed stability calculation unit 33, and an electrically-controlled generator selection unit 34 and includes a stability sensitivity database DB4, a PCS power supply severe parallel-off condition extracting unit 41, and a PCS power supply parallel-off sensitivity composing unit 42 according to the present invention. Furthermore, a system stabilizing system 100 may be configured by providing the stability monitoring device 10 and an electric control device 60 including an electric control instruction unit 71.

A severity indicator calculated from an angular velocity and an internal phase angle for each generator is output by the severity indicator output unit 21.

In the simple stability calculation unit 31, by using information of the system information database DB1 in which fault conditions, such as locations and modes, are stored and information of the system configuration database DB2 in which system configurations, such as lines, generators, and PCS power supplies, are stored, simple stability calculation is performed for each fault case and each combination of a parallel-off or continuous operation of a PCS power supply. In the simple stability calculation, for example, simulation of a phenomenon for about one second is performed for each fault case.

The severity indicator calculation unit 32 calculates a severity indicator x from an angular velocity and an internal phase angle of each generator for each fault case (see PTL 1). A method of calculating the severity indicator x will be described below. The detailed stability calculation unit 33 performs a detailed stability calculation for a fault case corresponding to the severity indicator x that is equal to or greater than a threshold x_th at which it is determined that a generator steps out, and then it is determined whether the system is stable or unstable.

In the electrically-controlled generator selection unit 34, referring to a result of the detailed stability calculation, a generator having a possibility of step-out is selected.

In the PCS power supply severe condition extracting unit 41, for a generator corresponding to a severity indicator x that is equal to or greater than a certain threshold x_th for each fault case, by using a parallel-off sensitivity indicator y representing a degree of influence of a change of the output at the time of a parallel-off of a PCS power supply on the internal phase angle in a preliminary table stored in the stability sensitivity database DB4, for example, when the value of a parallel-off severity indicator w is equal to or greater than a certain threshold w_th, the parallel-off severity indicator w is extracted as a fault case in a combination of a parallel-off or a continuous operation of a PCS power supply corresponding to the generator having a possibility of step-out. A method of calculating the parallel-off severity indicator w will be described below.

As the values of indicators (x, y, and w) increase, it becomes difficult to maintain synchronization with another generator, and thus a generator may easily step out.

In the PCS power supply parallel-off sensitivity composing unit 42, by using information of the system configuration database DB2 storing system configurations such as lines, generator, and PCS power supplies and information of the PCS power supply maintenance database DB3 storing PCS power supply maintenance information such as schedules for shutdown and repair of PCS power supplies, every time the PCS power supply maintenance information is updated, a preliminary table related to the parallel-off sensitivity indicator y representing a degree of influence of an output change at the time of parallel-off of a PCS power supply on the internal phase angle of a generator is composed only for an active PCS power supply. A method of calculating the parallel-off sensitivity indicator y will be described below.

In the system stabilizing system 100, based on a result output from the electrically-controlled generator selection unit 34 of the stability monitoring device 10, the electric control instruction unit 71 of electric control device 60 issues an electric control command.

Figure 2:
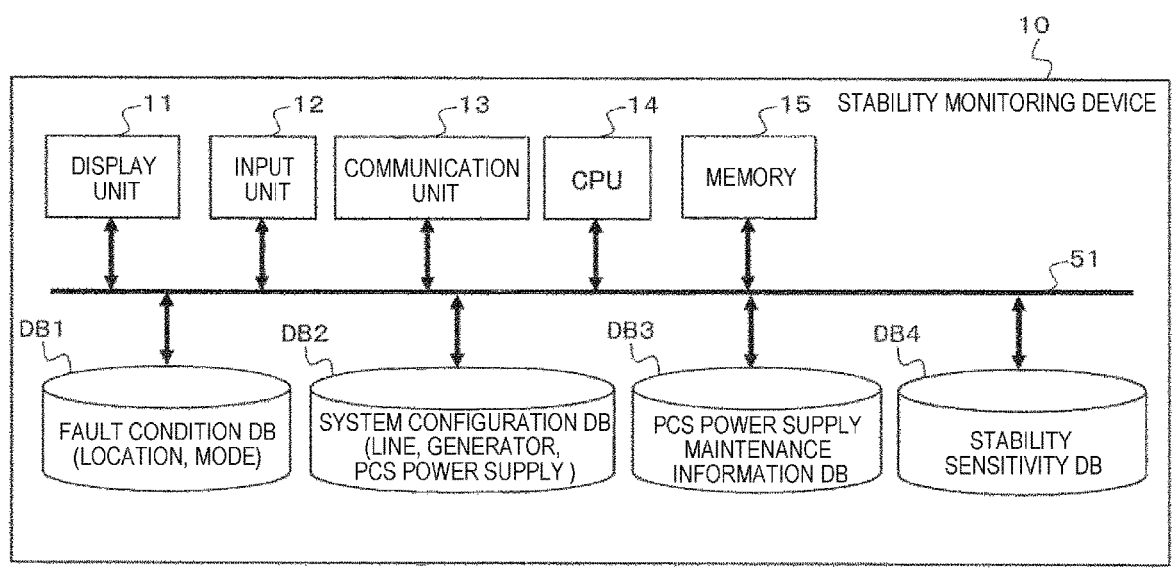
FIG. 2 is a diagram showing an example of a hardware configuration of a stability monitoring device.

FIG. 2 is a diagram showing an example of a hardware configuration of a stability monitoring device to which the embodiment of the present invention is applied. The stability monitoring device 10 includes a computer system, and a display unit 11, such as a display device, an input unit 12, such as a keyboard and a mouse, a communication unit 13, a CPU 14, a memory 15, and various databases are connected to a bus line 51. As databases of stability monitoring device, the fault condition database DB1, the system configuration database DB2, the PCS power supply maintenance information database DB3, and the stability sensitivity database DB4 are provided.

For example, the display unit 11 may be configured to employ a printer device or an audio output device instead of or in addition to a display device. The input unit 12 can be configured to include at least one of a keyboard switch, a pointing device such as a mouse, a touch panel, and a voice instruction device, for example. The communication unit 13 includes a circuit and a communication protocol for connecting to a communication network. The CPU 14 executes a calculation program, thereby instructing image data to be displayed or searching for data in various databases. The CPU 14 may be configured as one or a plurality of semiconductor chips or may be configured as a computer device such as a calculation server. The memory 15 is configured as, for example, a random access memory (RAM) and may store a computer program or may store calculation result data and image data necessary for each processing. Screen data stored in the memory 15 is transmitted to the display unit 11 to be displayed.

Figure 3:
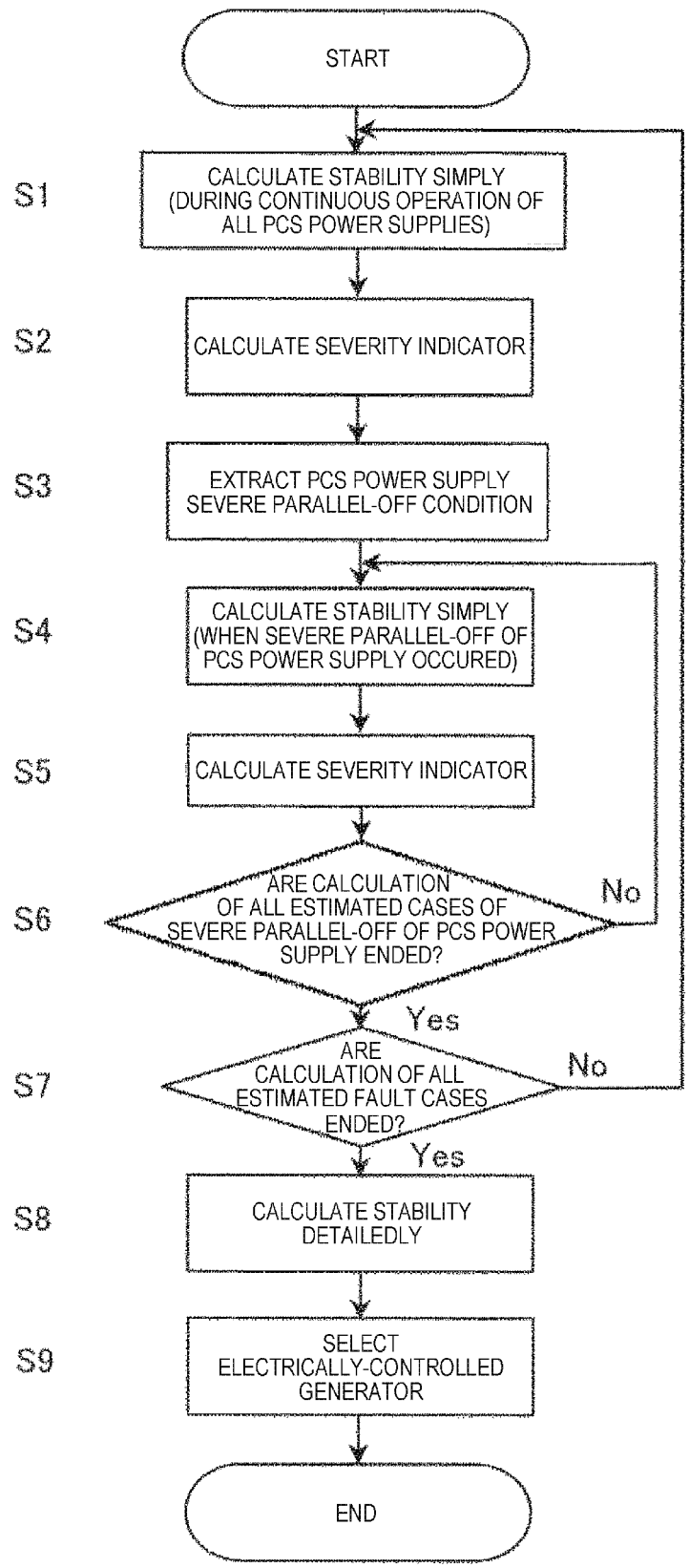
FIG. 3 is a flowchart showing an example of the overall processes of a stability monitoring device.

FIG. 3 is a flow chart showing the overall processes of a stability monitoring device. In step S1, a simple stability calculation is performed assuming that all PCS power supplies are continuously operated, based on a fault condition and a system configuration. In the simple stability calculation, for example, a detailed stability calculation is performed for about one second for each fault case. In step S2, the severity indicator x is calculated from an angular velocity or an internal phase angle of each generator for each fault case. For example, a method of calculating the severity indicator x by using a first indicator value Ke and a second indicator value KE representing the severity of a power system immediately after the occurrence of a system fault will be described below (PTL 1).

The indicator value Ke is the maximum value of an increasing rate Kei (%) of the kinetic energy of each generator from before the occurrence of the fault and is expressed by Equations (1) and (2).

$$Kei = \{Mi(\omega 0i+\omega i)(\omega \omega 0i\omega i/2 - Mi\omega \omega 0\omega 0/2) \div Mi\omega \omega 0i\omega 0/2 = \omega i/\omega 0i\}\{2+(\omega i/\omega 0i)\} \quad \text{[Equation 1]}$$

$$Kei = \max(Kei) \quad \text{[Equation 2]}$$

Here, i denotes a generator number, $\omega 0i$ denotes an angular velocity of a generator i before the occurrence of a fault, $\omega i$ denotes an angular velocity of the generator i after the occurrence of the fault, and Mi denotes an inertia constant of the generator i.

Furthermore, the maximum value KE (s %) of KEi, which is a value obtained by time integrating the increasing rate Kei of the kinetic energy of a generator, is calculated as shown in Equations (3) to (5).

$$KEi = \int Kei/2 \, dt \quad \text{[Equation 3]}$$

$$\theta i = \int \omega i \, dt \approx \omega 0i \int Kei/2 \, dt = \omega 0i \cdot KEi \quad \text{[Equation 4]}$$

$$KE = \max(KEi) \quad \text{[Equation 5]}$$

Here, $\theta$ denotes an internal phase angle and $\theta i$ denotes a phase angle change.

At a stability limit where an internal phase angle $\delta$ of a generator is about 110°, indicator values of a value of 2.5(%) indicating the stability limit of Ke and a value of 0.5 (% s) indicating the stability limit of KE are normalized, and the severity indicator x is calculated by multiplying the normalized values. x is expressed by the following equation.

$$X = (Ke/2.5)*(KE/0.5) \quad \text{[Equation 6]}$$

In Equation (6), in an unstable state, the indicator value Ke becomes greater than 2.5, and the indicator value KE also becomes greater than 0.5. Therefore, it is determined whether the state is stable or unstable based on whether x becomes greater than the threshold x_th of 1.

FIG. 4 is a diagram showing an example of rankings of severity indicators in a simple stability calculation. In severity indicator rankings, rankings are allocated based on the severity indicator x. Although FIG. 4 shows the rankings for respective fault points, rankings may be set based on fault modes, such as a one ground fault for one line or three ground faults for one line. In step S3, in a fault case where there is a generator corresponding to the severity indicator x equal to or greater than a certain threshold x_th, a combination of parallel-off or continuous operation of PCS power supplies with which the stability of a power system becomes severe is extracted based on the parallel-off severity indicator w (see the description of FIG. 7 below). A method of calculating the parallel-off severity indicator w will be described below. In step S4, a simple transient stability calculation is performed for each combination of parallel-off or continuous operation of PCS power supplies extracted in step S3 with which the stability of the power system becomes severe. In step S5, for each of the severe combinations of PCS power supplies, the severity indicator x is calculated from an angular velocity and an internal phase angle of each generator. FIG. 5 is a diagram showing an example of rankings of severity indicators in a simple stability calculation. In severity indicator rankings, rankings are allocated based on the severity indicator x. The method of allocating rankings disclosed in the known example 1 and the known example 2 do not take the presence/absence of parallel-off of a PCS power supply into account, and thus the change of stability due to parallel-off of the PCS power supply cannot be considered. Therefore, in the case of a system in which the number of PCS power supplies is increased, it is necessary to take into account whether parallel-off occurs at each PCS power supply in addition to fault points and allocate rankings. In step S6, if not all of calculations of combinations of parallel-off or continuous operation of the PCS power supplies with which the stability of the power system becomes severe are completed, the process returns to step S4. If all of the calculations of combinations of parallel-off or continuous operation of the PCS power supplies with which the stability of the power system becomes severe are completed, the process proceeds to step S7. In step S7, if not all of calculations of assumed fault cases for each fault point are completed, the process returns to step S1. and if all of the calculations of assumed fault cases for each fault point are completed, the process proceeds to step S8. In step S8, a detailed stability calculation is performed for each combination of parallel-off or continuous operation of PCS power supplies obtained in step S5 with which the stability of the power system becomes severe. FIG. 6 is a diagram showing an example of severity indicator rankings calculated through simple stability calculations and times until step-out and maximum internal phase angle differences calculated through detailed stability calculations. Results consistent with severities of assumed fault points based on detailed transient stability calculation results can be obtained through simple stability calculations. In step S9, based on a result of the detailed stability calculation in step S7, a generator to be electrically controlled is selected.

Figure 7:
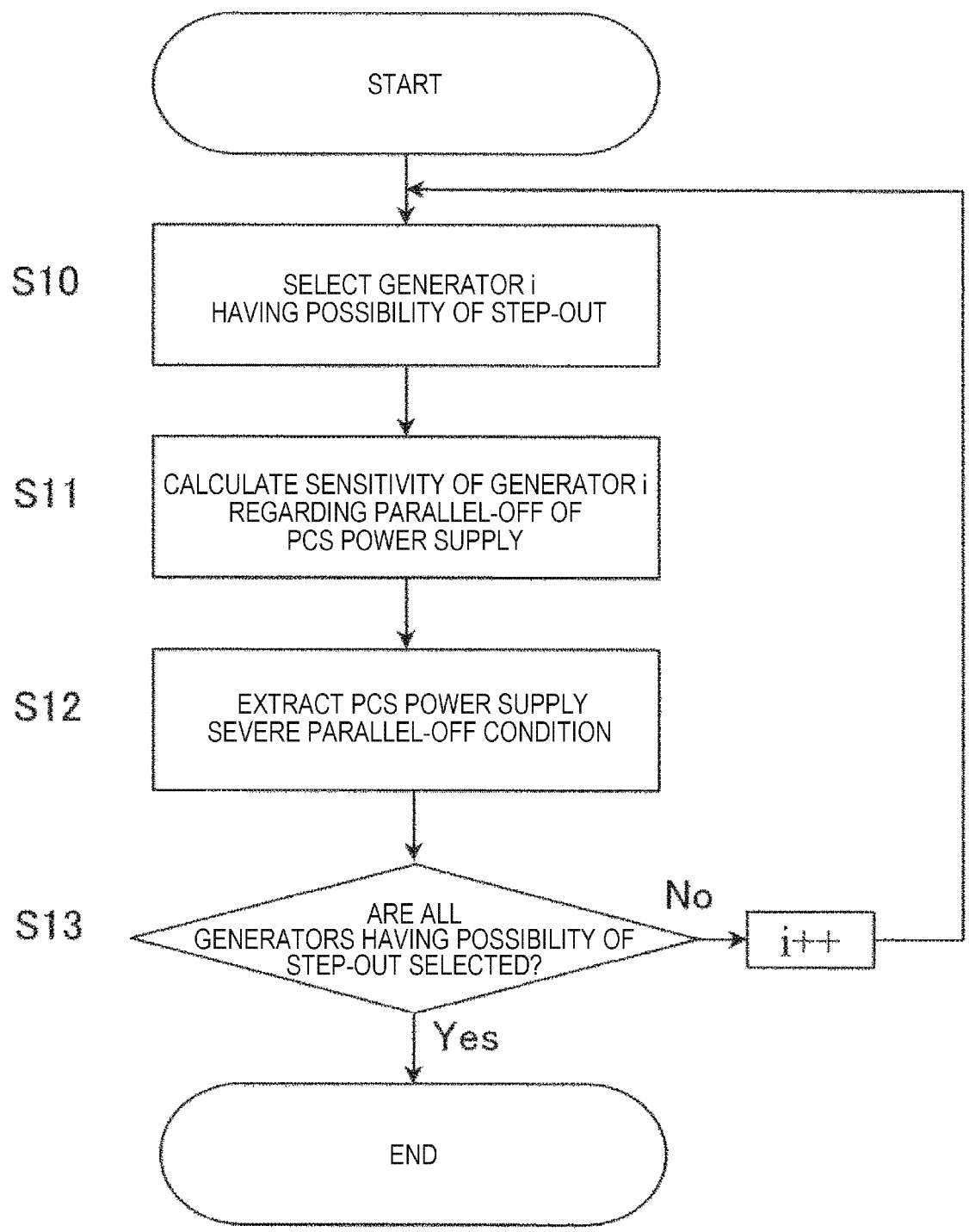
FIG. 7 is a flowchart showing an example of a process for extracting a severe parallel-off condition.

FIG. 7 is a flowchart showing the process for extracting a severe parallel-off condition (see step S3 in FIG. 3). In step S10, a generator i corresponding to the severity indicator x equal to or greater than a certain threshold x_th is selected through a simple stability calculation corresponding to a case where all PCS power supplies are in the continuous operation state. In step S11, for the generator i corresponding to the severity indicator x equal to or greater than a certain threshold x_th for each fault case, a parallel-off sensitivity indicator y representing a degree of influence of an output change at the time of parallel-off of a PCS power supply on the internal phase angle of the generator is obtained for each fault case. A method of calculating the parallel-off sensitivity indicator y will be described in the section of the description of FIG. 8. In step S12, by using internal phase angle changes y of a generator corresponding to the severity indicator x equal to or greater than a certain threshold x_th due to a simple stability calculation in a combination condition of parallel-offs and continuous operations of a PCS power supply with which the stability of the power system becomes severe and a generator corresponding an output change of the PCS power supply, for example, when the value of a parallel-off severity indicator w becomes equal to or greater than a certain threshold w_th, the parallel-off severity indicator w is extracted as a fault case in a combination of parallel-off and continuous operations of a PCS power supply corresponding to the generator having a possibility of step-out. A method of calculating the parallel-off severity indicator w will be described below. In step S13, if not all of calculations for generators corresponding to the severity indicator x equal to or greater than a certain threshold x_th are completed, the process returns to step S10. If all of the calculations for the generators corresponding to the severity indicator x equal to or greater than a certain threshold x_th are completed, a flow for processing severe parallel-off condition extraction is ended.

Figure 8:
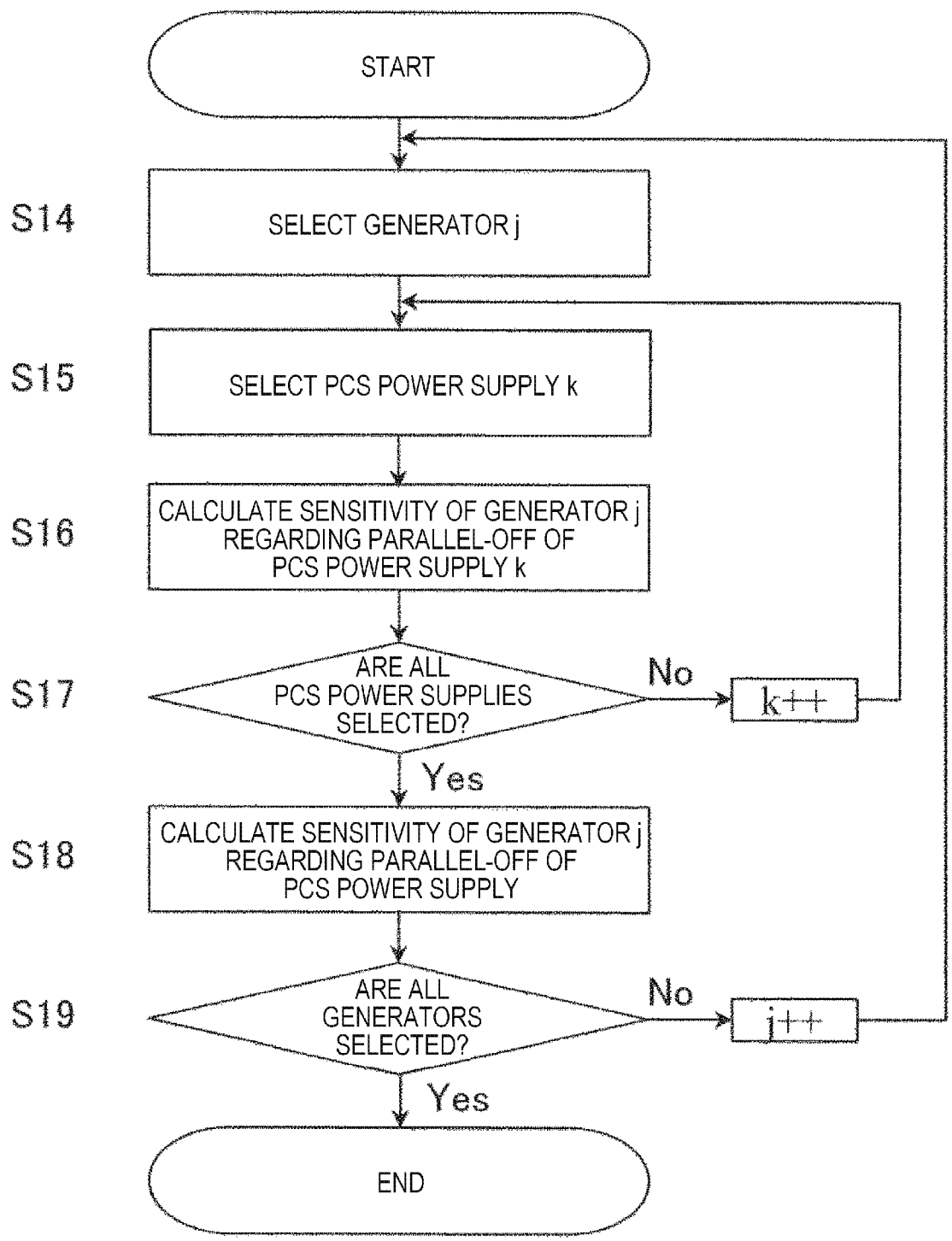
FIG. 8 is a flowchart showing an example of a process for composing a PCS power supply parallel-off sensitivity.
Figure 9:
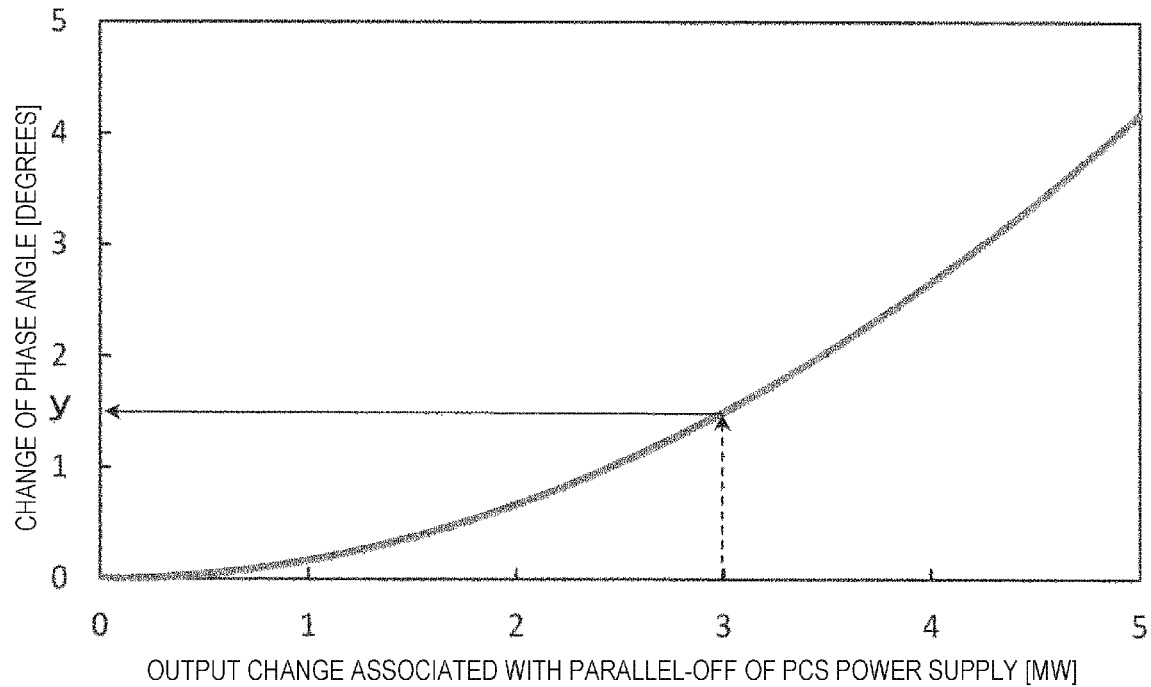
FIG. 9 is an example of a preliminary operation table showing a parallel-off sensitivity indicator that represents a degree of influence of parallel-off of one PCS power supply on the internal phase angle of a generator.
Figure 10:
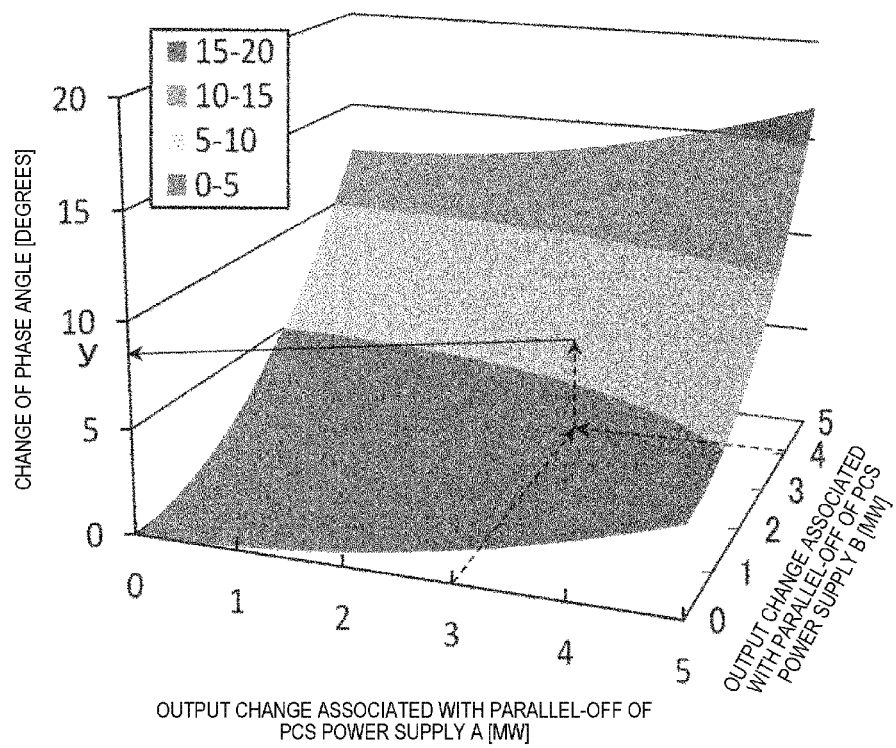
FIG. 10 is an example of a preliminary operation table showing a parallel-off sensitivity indicator that represents a degree of influence of parallel-off of two PCS power supplies on the internal phase angle of a generator.

FIG. 8 is a flowchart showing a process (step S11 in FIG. 7) for composing PCS power supply parallel-off sensitivity that is necessary for calculating severity of a generator i as a method of composing the stability sensitivity base DB4. The entire process of the stability monitoring device shown in FIG. 3 and the process for extracting severe parallel-off conditions shown in FIG. 7 are on-line processes, and since this process is an off-line process, it should be noted that there is no direct relationship between the generator i and a generator j. In step S14, the generator j is selected from among all generators. In step S15, a PCS power supply k is selected from among all PCS power supplies. In step S16, the parallel-off sensitivity indicator y representing a degree of influence on an output change of the PCS power supply k to the internal phase angle of the generator j is calculated. The sensitivity is indicated by an internal phase angle change amount of the generator j given from the PCS power supply k, for example. As shown in FIG. 9, a preliminary table in which the horizontal axis represents output changes associated with parallel-off of a PCS power supply and the vertical axis represents a relationship between internal phase angle changes of a generator and output changes of the PCS power supply is composed. FIG. 9 shows that, when the output change associated with the parallel-off of the PCS power supply is 3 MW, the phase angle change is 1.5 degrees. In step S17, if not all of selections of a PCS power supply within a system is completed, the process returns to step S15. If the selection of a PCS power supply within the system is completed, the process proceeds to step S18. In step S18, the parallel-off sensitivity indicator y representing a degree of influence of output changes of a plurality of PCS power supplies on the internal phase angle of the generator j is calculated. FIG. 10 is a diagram showing an example of a system in which two PCS power supplies A and B are connected, for example. A preliminary table in which the horizontal axis represents output changes associated with the parallel-off of the PCS power supply A, the depth axis represents output changes associated with the parallel-off of the PCS power supply B, and the vertical axis represents a relationship between internal phase angle changes of a generator and output changes of the PCS power supplies is composed. FIG. 10 shows that, when the output change associated with the parallel-off of the PCS power supply A is 3 MW and the output change associated with the parallel-off of the PCS power supply B is 4 MW, the change of the phase angle is 8 degrees. A preliminary table regarding a system in which three or more PCS power supplies are connected is composed in the same way. In step S19, if not all of selections of generators in a system are completed, the process returns to step S12. If the selections of the generators in the system are completed, the process for composing a PCS power supply parallel-off sensitivity is ended.

Figure 11:
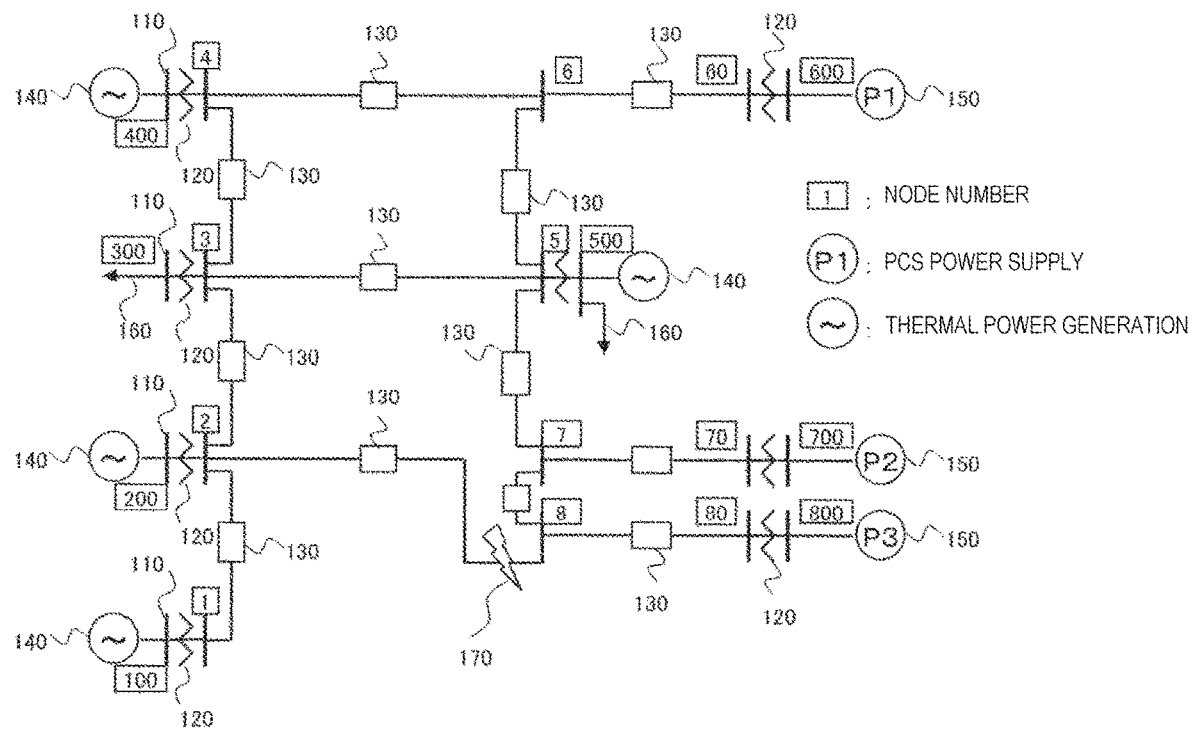
FIG. 11 is a diagram showing an example of a system model to which three PCS power supplies are connected.

According to the first embodiment, fault cases can be narrowed down to only cases corresponding to a combination with which stability becomes severe, and thus a calculation period can be shortened. The effect thereof will be described below. For example, FIG. 11 shows an example of a system model in which three PCS power supplies (P1, P2, and P3) are connected. FIG. 12 is a diagram showing an example of a PCS power supply pattern for allocating rankings through a simple stability calculation according to the first embodiment when a system fault occurs in the vicinity of eight nodes in this system model. FIG. 13 is a diagram showing an example of a PCS power supply pattern for allocating rankings through a simple stability calculation according to the known example when a system fault occurs in the vicinity of eight nodes in this system model. In step S12, for example, when the value of the parallel-off severity indicator w is equal to or greater than a certain threshold of 1.0, by extracting the parallel-off severity indicator w as a combination of a parallel-off and continuous operation of a PCS power supply corresponding to the generator having a possibility of step-out, as compared to the known example, the number of fault cases can be narrowed down from 8 patterns to 5 patterns, and thus the calculation period can be shortened. The diagonal lines in FIG. 12 indicate excluded fault cases.

Next, a method of calculating the indicator w will be described. Since parallel-off severity increases when y is positive and decreases when y is negative, the ratio of the parallel-off sensitivity indicator y to an internal phase angle δ of 110° is reflected in Equation (6) to calculate the severity indicator w. w is expressed by the following equation.

$$W=((Ke/2.5)*(KE/0.5))*((110+y)/110)=x*((110+y)/110) \quad \text{[Equation 7]}$$

In Equation (7), in an unstable state, the indicator value Ke becomes greater than 2.5, the indicator value KE becomes greater than 0.5, and the parallel-off sensitivity indicator y becomes greater than 0, and thus it is determined whether the state is stable or unstable based on whether w becomes greater than a threshold w_th of 1.0.

Figure 14:
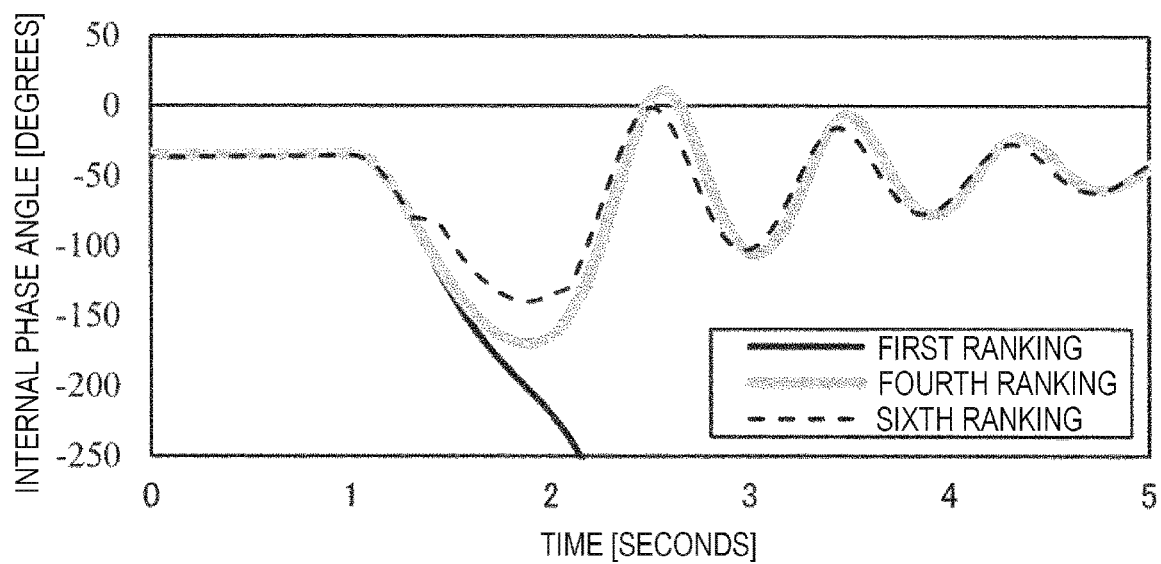
FIG. 14 is a diagram showing an example of a result of performing a detailed stability calculation according to the first embodiment.

FIG. 14 shows an example of the waveform of internal phase angles of generators in fault cases of the first ranking, the fourth ranking, and the sixth ranking shown in FIG. 12. As shown in FIG. 14, as the internal phase angle of a first wave increases, a corresponding generator tends to step out more easily. The parallel-off severity indicator w calculated by the PCS severe parallel-off condition extracting unit 41 of the stability monitoring device 10 shown in FIG. 1 according to the present embodiment can indicate a degree of easiness of step-out due to an increase of an internal phase angle. For this reason, by allocating rankings based on the parallel-off severity indicator w and performing a detailed calculation for upper cases, countermeasures, such as power supply restriction or a load restriction, for preventing propagation of faults can be implemented in advance.

Second Embodiment

Embodiments of the present invention will be described below. Descriptions identical to those given above according to the first embodiment will be omitted.

Figure 15:
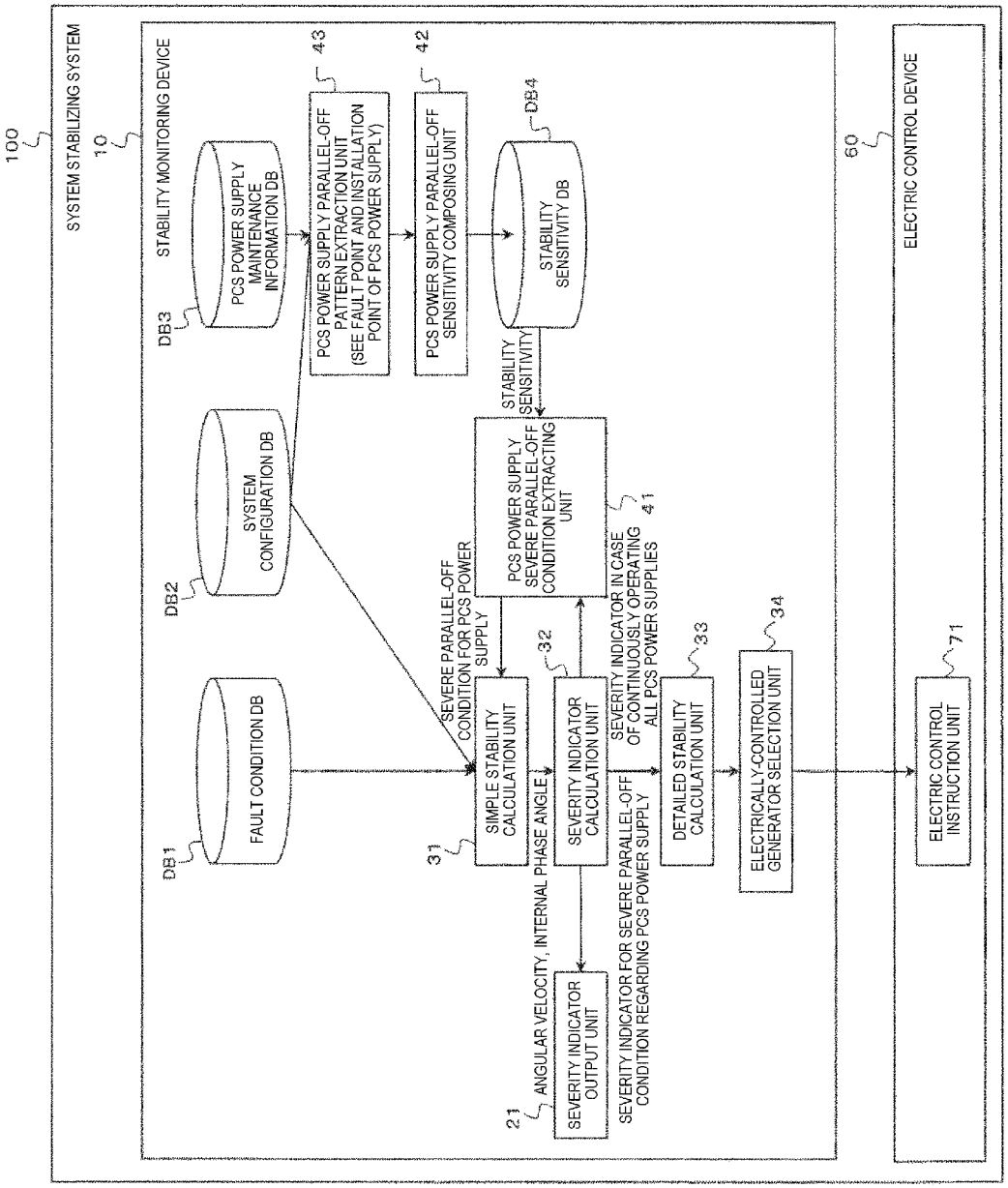
FIG. 15 is a diagram showing an example of a software configuration of a stability monitoring device further including a PCS power supply severe pattern extraction unit (see a fault point and an installation point of a PCS power supply).

A stability monitoring device 10 according to the second embodiment shown in FIG. 15 further includes a PCS power supply severe pattern extraction unit 43 as compared to the first embodiment and reduces the size of data stored in the stability sensitivity DB4, thereby exhibiting the effect of reducing the cost of an operator.

In the PCS power supply parallel-off pattern extraction unit 43, by using information of the system configuration database DB2 in which system configurations such as lines, generators, and PCS power supplies are stored and information of the PCS power supply maintenance database DB3 in which PCS power supply maintenance information such as schedules for shutdown and repair of PCS power supplies are stored, fault cases are narrowed down to possible combinations of parallel-offs and continuous operations from $2^N$ fault cases corresponding to parallel-offs and continuous operations of PCS power supplies.

Figure 16:
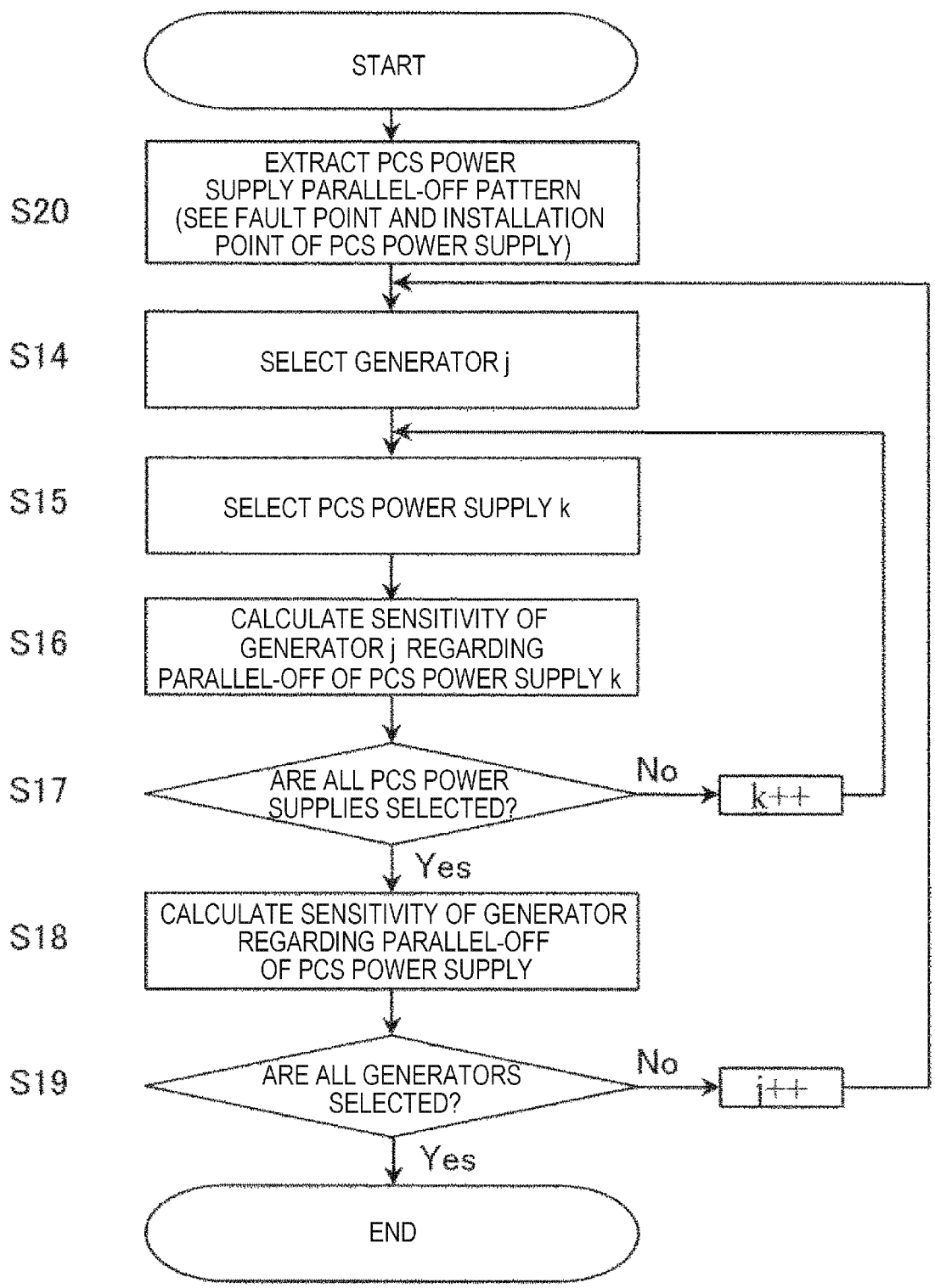
FIG. 16 is a flowchart showing an example of a process for composing a PCS power supply parallel-off sensitivity, the process further including the process of the PCS power supply severe pattern extraction unit (see a fault point and an installation point of a PCS power supply).

FIG. 16 is a flowchart showing an example of a process for composing a PCS power supply parallel-off sensitivity, the process further including process step 20 for extracting a PCS power supply severe pattern. In the process step 20, which is a difference from the first embodiment, for example, referring to an electrical distance z between an assumed fault point and an installation location of a PCS power supply and, for example, referring to an equivalent impedance viewed from a fault point and the shortest impedance to the fault point, when the electrical distance z is equal to or greater than a certain threshold z_th, the number of combinations of parallel-offs and continuous operations of the PCS power supply is narrowed down by assuming that only the state of continuous operation of the PCS power supply is taken.

Figure 18:
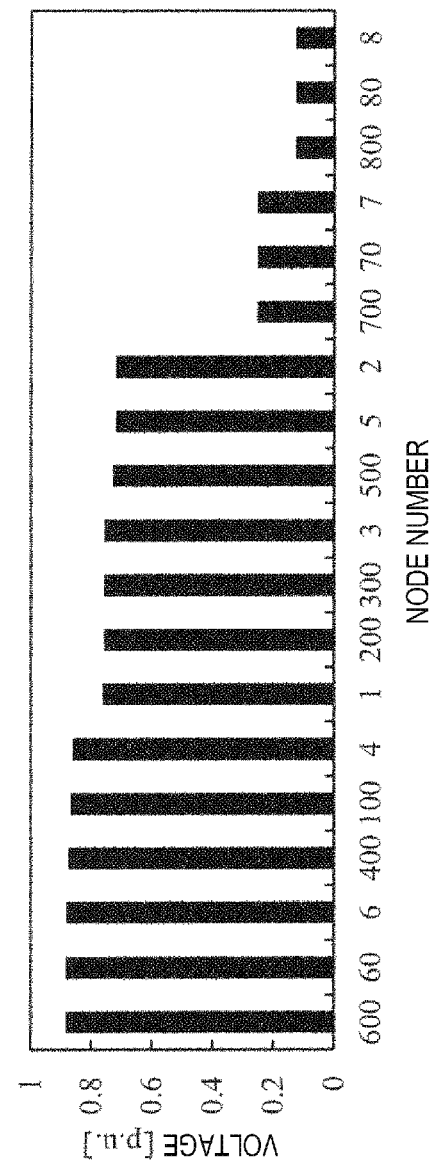
FIG. 18 is a diagram showing an example of a simulation result of fault voltages at respective nodes during a detailed stability analysis.

According to the second embodiment, by narrowing down possible combinations of parallel-offs and continuous operations from the $2^N$ fault cases of parallel-offs and continuous operations of a PCS power supply and composing a preliminary table, the amount of data to be stored in a database can be reduced. The effect thereof will be described below. For example, FIG. 11 shows an example of a system model in which three PCS power supplies (P1, P2, and P3) are connected. FIG. 17 is a diagram showing an example of a PCS power supply pattern for allocating rankings through a simple stability calculation according to the second embodiment when a system fault occurs in the vicinity of eight nodes in this system model. In step S20, for example, when an electrical distance (impedance) of a power transmission line 130 shown in FIG. 11 is denoted by z and the shortest electrical distance between an assumed fault point and an installation location of a PCS power supply is 4z or greater, it is determined that parallel-off does not occur. Since P1 takes only the state of continuous operation, as compared to the first embodiment (see FIG. 12), the amount of data to be stored in a database can be reduced by narrowing down the number of fault cases from 5 patterns to 3 patterns and composing a preliminary table. The diagonal lines in FIG. 17 indicate excluded fault cases. FIG. 18 is a diagram showing an example of a simulation result of fault voltages at respective nodes during a detailed stability analysis. Comparing a result of a node 600 to which P1 is connected, a result of a node 700 to which P2 is connected, and a result of a node 800 to which P3 is connected with one another, fault voltages also decreases in the descending order of corresponding electrical distances from fault points (the node 800, the node 700, and the node 600). Since there is a positive correlation between electrical distances between fault points and nodes and the magnitudes of fault voltages, if an electrical distance between a fault point and a node is large, the drop in a node voltage is small. When a node voltage decreases, a generator may be paralleled-off (described below in a third embodiment).

Third Embodiment

Embodiments of the present invention will be described below. Descriptions identical to those given above according to the first embodiment will be omitted.

Figure 19:
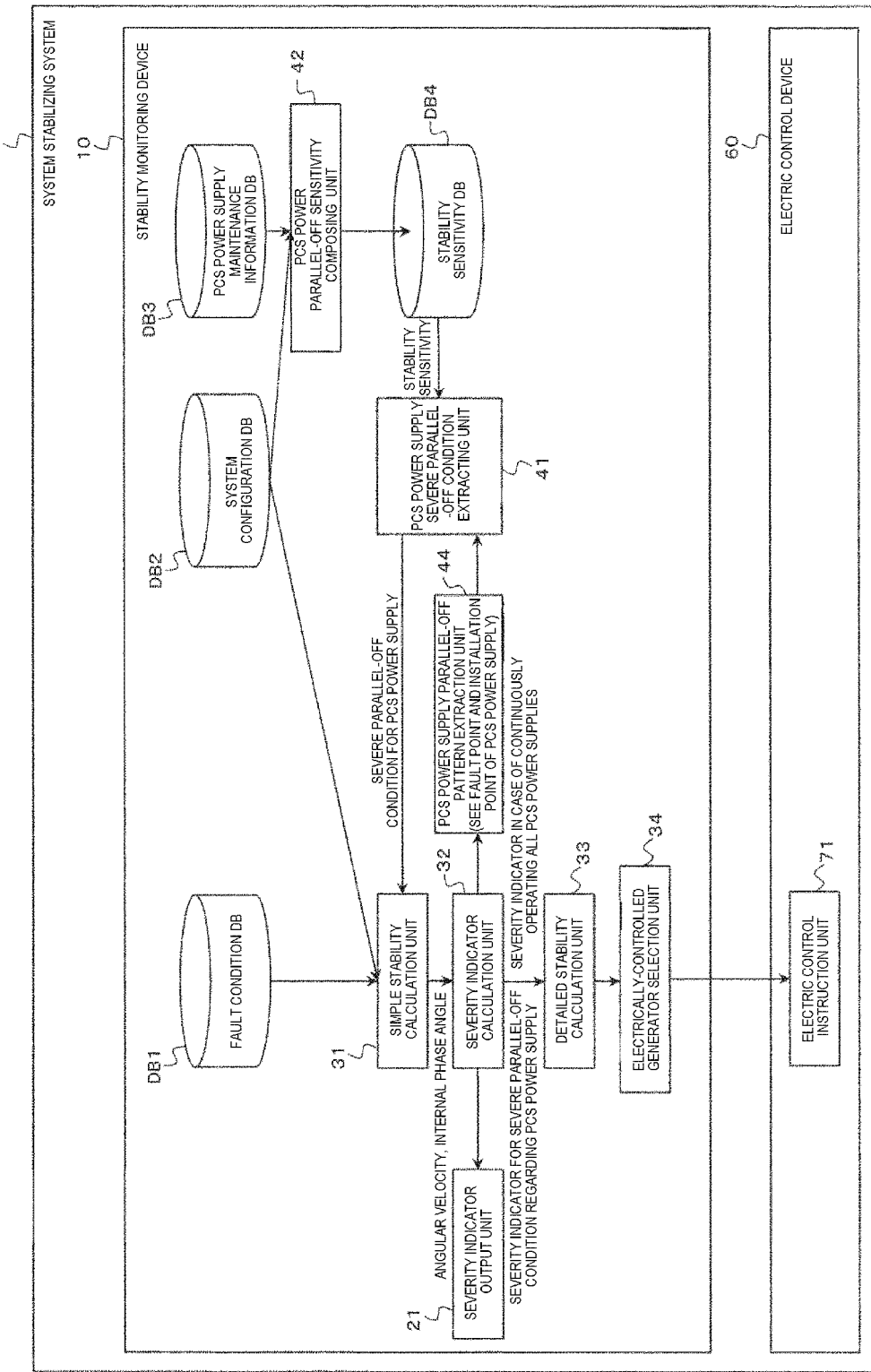
FIG. 19 is a diagram showing an example of a software configuration of a stability monitoring device further including a PCS power supply severe pattern extraction unit (see fault voltages).

A stability monitoring device 10 of the third embodiment shown in FIG. 19 further includes the PCS power supply severe pattern extraction unit 44 as compared to the first embodiment and narrows down combinations of parallel-offs and continuous operations of PCS power supplies subject to detailed calculation, and thus a calculation period can be shortened.

In the PCS power supply parallel-off pattern extraction unit 44, by determining the state of parallel-off or continuous operation from voltages of PCS power supply connection nodes during a simple stability calculation when all PCS power supplies are in continuous operation state, combinations of parallel-offs and continuous operations of PCS power supplies are narrowed down to possible combinations.

Figure 20:
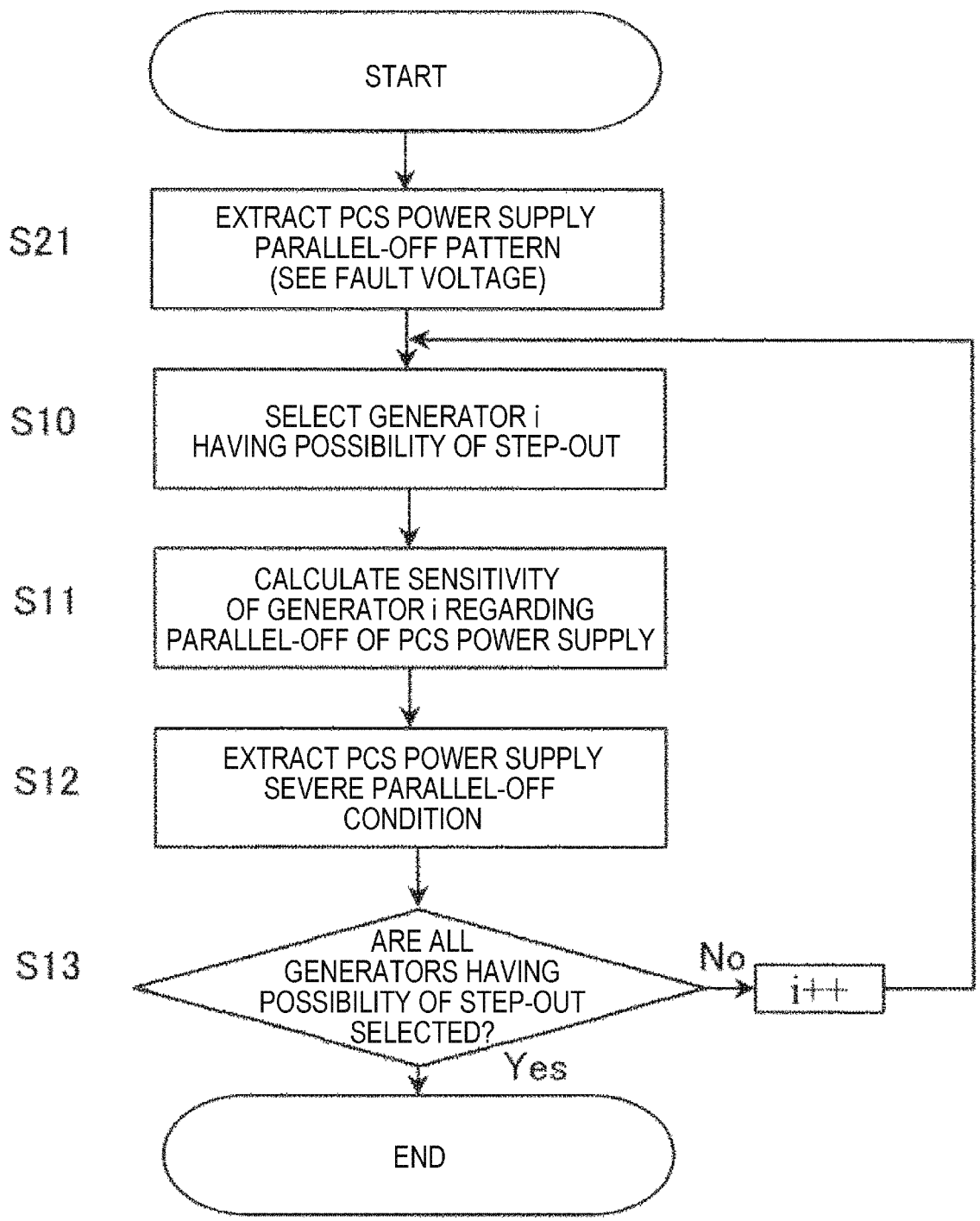
FIG. 20 is a flowchart showing an example of a process for composing a PCS power supply parallel-off sensitivity, the process further including the process of the PCS power supply severe pattern extraction unit (see fault voltages).

FIG. 20 is a flowchart showing an example of a process for composing a PCS power supply parallel-off sensitivity, the process further including process step 21 for extracting a PCS power supply severe pattern. In the process step 21, which is a difference from the first embodiment, by referring to voltages of PCS power supply connection nodes immediately after a fault occurs while all PCS power supplies are in continuous operation state, the state of parallel-off or continuous operation is determined, and thus combinations of parallel-offs and continuous operations of PCS power supplies are narrowed down to possible combinations.

Figure 21:
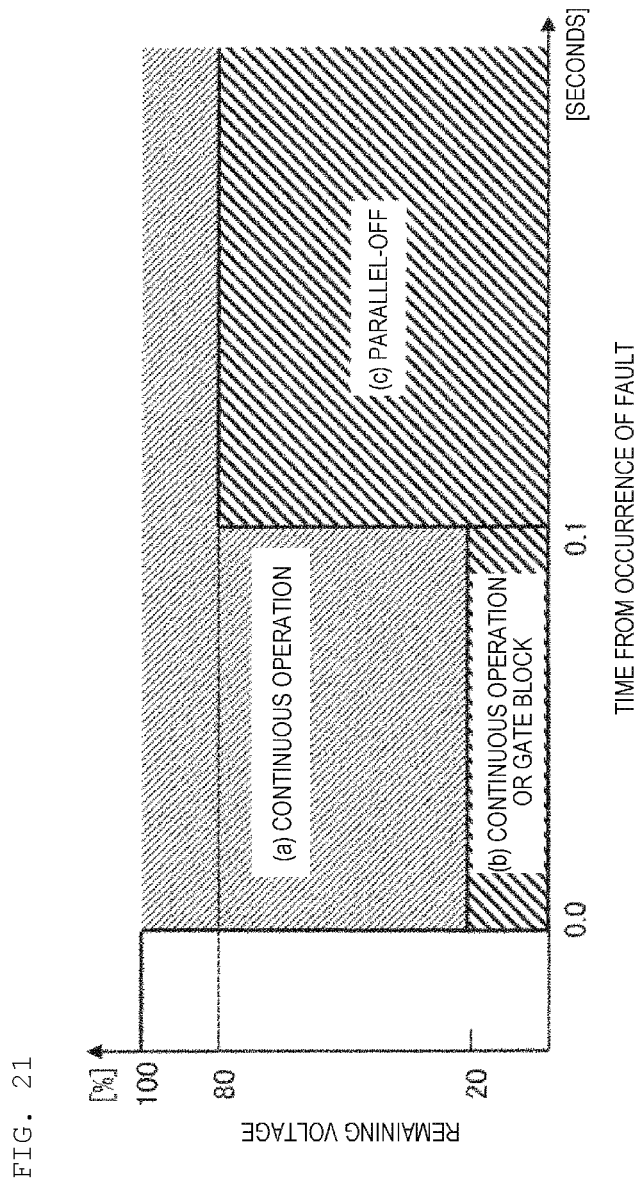
FIG. 21 is a diagram showing an example of FRT characteristics of a PCS power supply.

FIG. 21 shows FRT characteristic of a PCS power supply (NPL 2). Depending on fault voltage, a PCS power supply is in the state of (a) continuous operation, (b) continuous operation or gate block, and (c) parallel-off.

As a determination method, it is assumed that, if the fault voltage corresponds to (a) continuous operation, a PCS power supply can take only the state of continuous operation. Also, it is assumed that, if the fault voltage corresponds to (b) continuous operation or gate block, a PCS power supply can take the state of parallel-off or continuous operation. When a gate is blocked, the output of a PCS power supply that shuts down a power generation equipment becomes 0, and thus it is handled as parallel-off here. Also, it is assumed that, if a fault voltage corresponds to (c) parallel-off, a PCS power supply can take only the state of parallel-off. Furthermore, even when voltage drop is in the vicinity of the boundary of (a), (b), and (c), it is assumed that both the state of continuous operation and the state of parallel-off can be taken. For example, if it is assumed that both the states can be taken when a voltage drop is 10% before and after a rated ratio at the boundary between (a) and (b), when a voltage is from 0% to 30% from 0.0 second to 0.1 seconds, a PCS power supply can take the state of parallel-off or the state of continuous operation.

Figure 23:
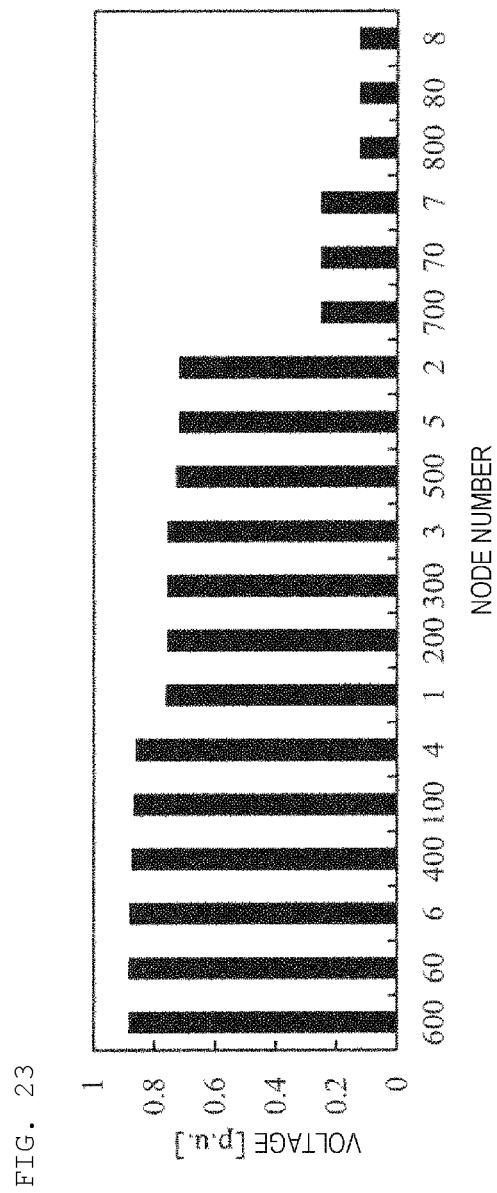
FIG. 23 is a diagram showing an example of a simulation result of node voltages during a simple stability analysis.

According to the third embodiment, fault cases can be narrowed down to only cases corresponding to a combination with which stability becomes severe, and thus a calculation period can be shortened. The effect thereof will be described below. For example, FIG. 11 shows an example of a system model in which three PCS power supplies (P1, P2, and P3) are connected. FIG. 22 is a diagram showing an example of a PCS power supply pattern for allocating rankings through a simple stability calculation according to the third embodiment when a system fault occurs in the vicinity of eight nodes in this system model. In step S21, for example, by assuming that, if the fault voltage shown in FIG. 23 is greater than 30%, a PCS power supply takes only a combination of continuous operations, the number of fault cases can be narrowed down from 5 patterns to 3 patterns as compared to the first embodiment (see FIG. 12), and thus the calculation period can be shortened. The diagonal lines in FIG. 22 indicate excluded fault cases.

Fourth Embodiment

Embodiments of the present invention will be described below. Descriptions identical to those given above according to the first embodiment will be omitted.

Figure 24:
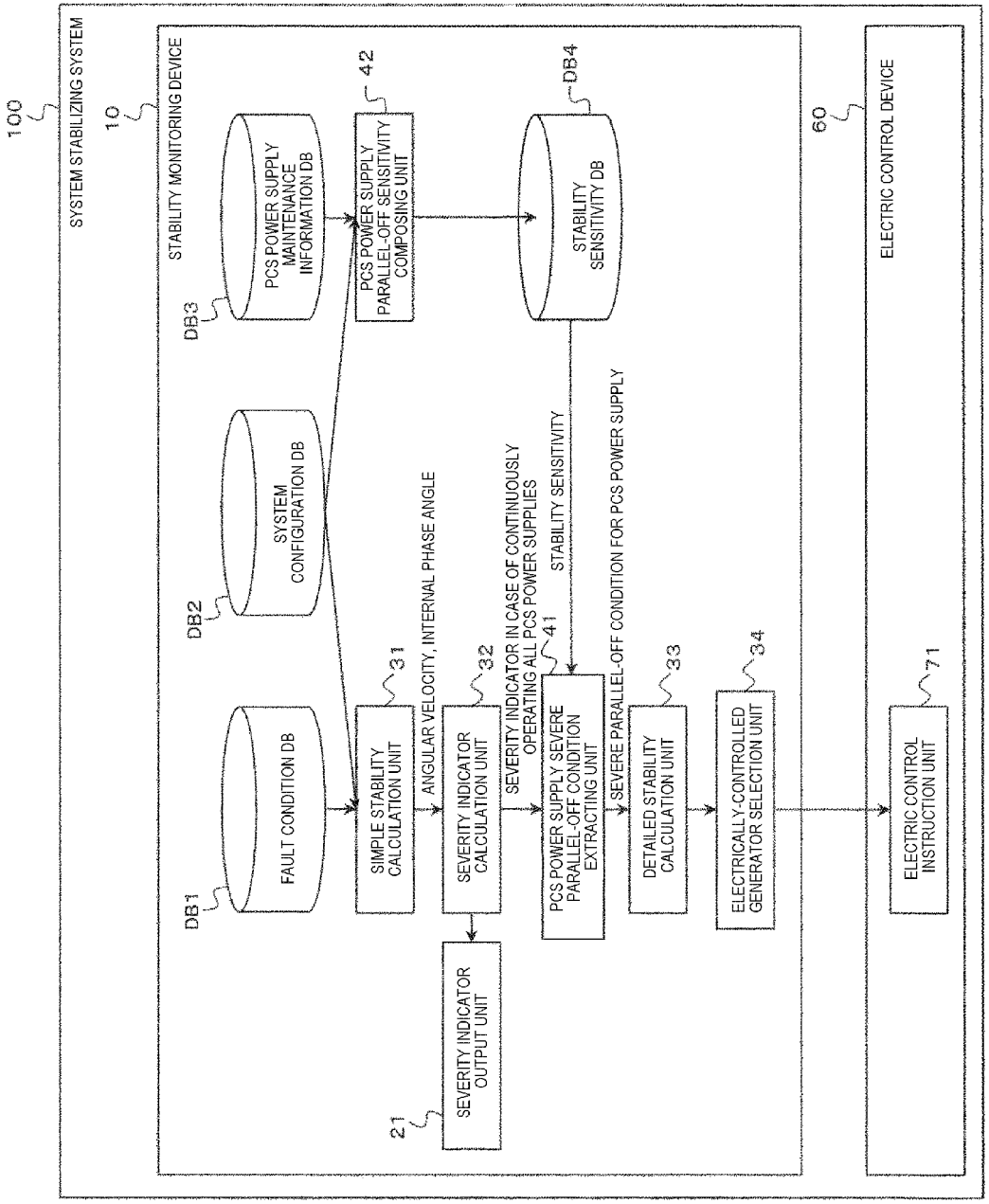
FIG. 24 is a diagram showing an example of a software configuration of a stability monitoring device.

A stability monitoring device 10 according to the fourth embodiment shown in FIG. 24 is obtained by changing the arrangement of the PCS power supply severe parallel-off condition extracting unit 41 as compared to the first embodiment. In this configuration, the function of calculating a severity indicator is excluded from the first embodiment by performing a simple stability calculation based on severe parallel-off conditions of a PCS power supply calculated by the PCS power supply severe parallel-off condition extracting unit 41, and thus the calculation period can be shortened.

Figure 25:
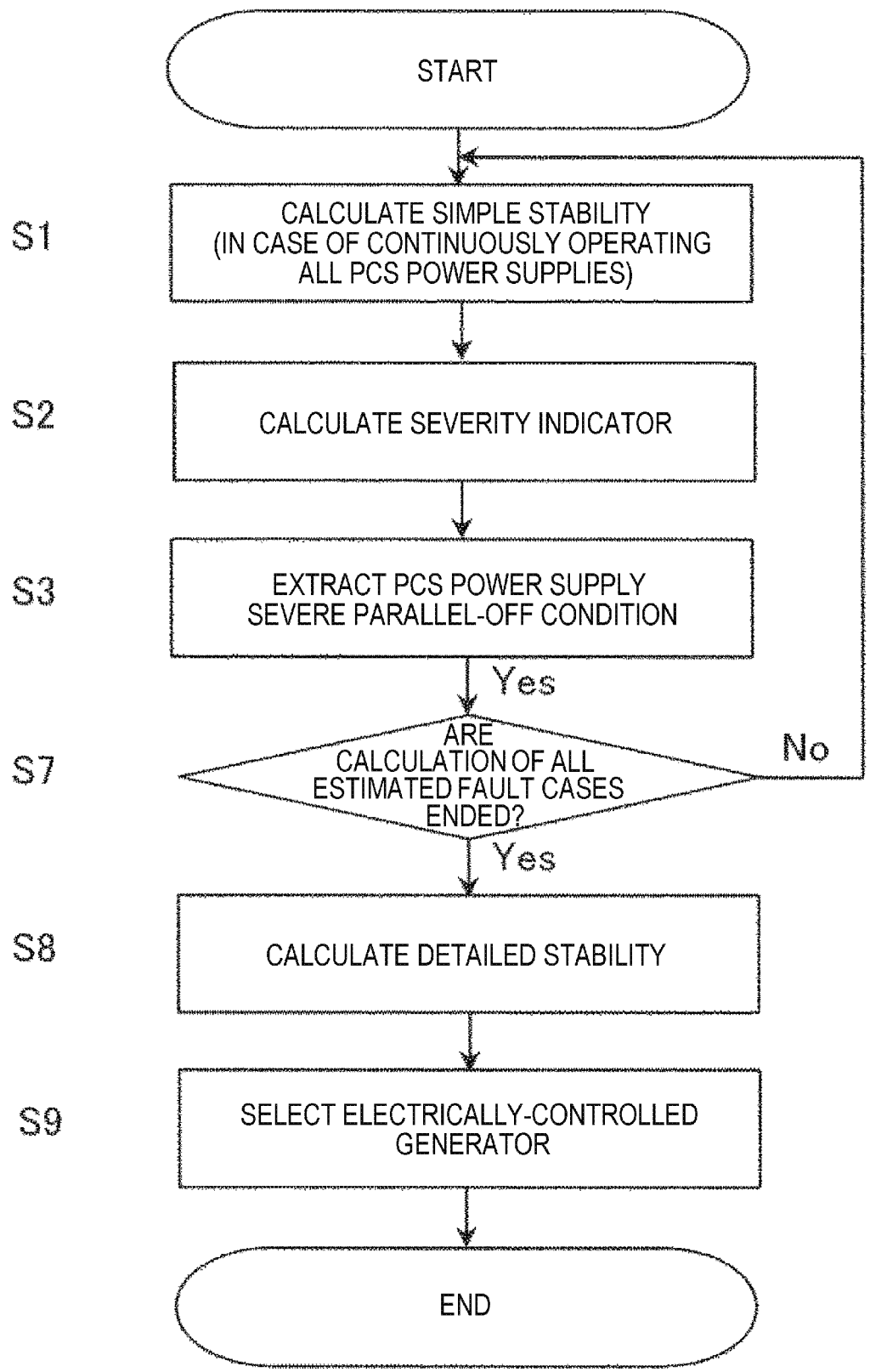
FIG. 25 is a flowchart showing an example of the overall processes of a stability monitoring device.

FIG. 25 is a flowchart showing the overall processes of the stability monitoring device. In this configuration, steps S4 and S5 are omitted from the first embodiment. In step S1, a simple stability calculation is performed when all PCS power supplies are continuously operated, based on a fault condition and a system configuration. In step S2, the severity indicator x is calculated from an angular velocity or an internal phase angle of each generator for each fault case. In step S3, fora fault case in which a generator corresponding to the severity indicator x equal to or greater than a certain threshold x_th exists, a combination of parallel-off and continuous operation of a PCS power supply with which the stability of a power system becomes severe is extracted. Details of step S3 are as described above with reference to FIG. 7 in the first embodiment (re-listed below).

FIG. 7 is a flowchart showing the process for extracting a severe parallel-off condition. In step S10, a generator i corresponding to the severity indicator x equal to or greater than a certain threshold x_th is selected through a simple stability calculation corresponding to a case where all PCS power supplies are in the continuous operation state. In step S11, for the generator i corresponding to the severity indicator x equal to or greater than a certain threshold x_th, a parallel-off sensitivity indicator y representing a degree of influence of an output change at the time of parallel-off of a PCS power supply on the internal phase angle of the generator is calculated for each fault case. A method of calculating the parallel-off sensitivity indicator y has been described above with reference to FIG. 8. In step S12, by using internal phase angle changes y of a generator corresponding to the severity indicator x equal to or greater than a certain threshold x_th due to a simple stability calculation in a combination condition of parallel-offs and continuous operations of a PCS power supply with which the stability of the power system becomes severe and a generator corresponding an output change of the PCS power supply, for example, when the value of a parallel-off severity indicator w becomes equal to or greater than a certain threshold w_th, the parallel-off severity indicator w is extracted as a fault case in a combination of parallel-off and continuous operations of a PCS power supply corresponding to the generator having a possibility of step-out. In step S13, if not all of calculations for generators corresponding to the severity indicator x equal to or greater than a certain threshold x_th are completed, the process returns to step S10. If all of the calculations for the generators corresponding to the severity indicator x equal to or greater than a certain threshold x_th are completed, a flow for processing severe parallel-off condition extraction is ended.

In step S7, if not all of calculations of assumed fault cases for each fault point are completed, the process returns to step S1. If all of the calculations of assumed fault cases for each fault point are completed, the process proceeds to step S8. In step S8, by using internal phase angle changes y of a generator corresponding to the severity indicator x equal to or greater than a certain threshold x_th due to a simple stability calculation in a combination condition of parallel-offs and continuous operations of a PCS power supply with which the stability of the power system becomes severe and a generator corresponding an output change of the PCS power supply, for example, when the value of a parallel-off severity indicator w becomes equal to or greater than a certain threshold w_th (see the above description of FIG. 7), a detailed stability calculation is performed by considering the case as a combination of parallel-off and continuous operations of the PCS power supply with which the stability of a power system becomes severe.

According to the fourth embodiment, a simple stability calculation for each combination of parallel-offs and continuous operations of a PCS power supply with which the stability of a power system becomes severe can be omitted, thereby shortening the calculation period. The effect thereof will be described below. For example, FIG. 11 shows an example of a system model in which three PCS power supplies (P1, P2, and P3) are connected. FIG. 26 is a diagram showing an example of severity indicator rankings for performing a detailed stability calculation according to the first embodiment and the fourth embodiment when a system fault occurs in the vicinity of eight nodes in this system model. In the first embodiment, referring to the value of the severity indicator x calculated based on the parallel-off severity indicator w, a detailed stability calculation is performed. On the other hand, in the fourth embodiment, referring to the value of the parallel-off severity indicator w, a detailed stability calculation is performed. Therefore, as compared to the first embodiment, the number of fault cases can be narrowed down from 5 patterns to 0 patterns, and thus the calculation period can be shortened. The diagonal lines in FIG. 26 indicate excluded fault cases. Since the parallel-off severity indicator w is a value obtained by adding the influence of the internal phase angle change y of a generator on an output change of a PCS power supply calculated in advance in the preliminary table to the severity indicator x obtained through a simple stability calculation when all PCS power supplies are in the continuous operation state, the deterioration of accuracy can be minimized. Furthermore, in order to guarantee the accuracy, the number of fault cases for a detailed stability calculation may be increased by decreasing the threshold w_th.

Fifth Embodiment

Embodiments of the present invention will be described below. Descriptions identical to those given above according to the first embodiment will be omitted.

Figure 27:
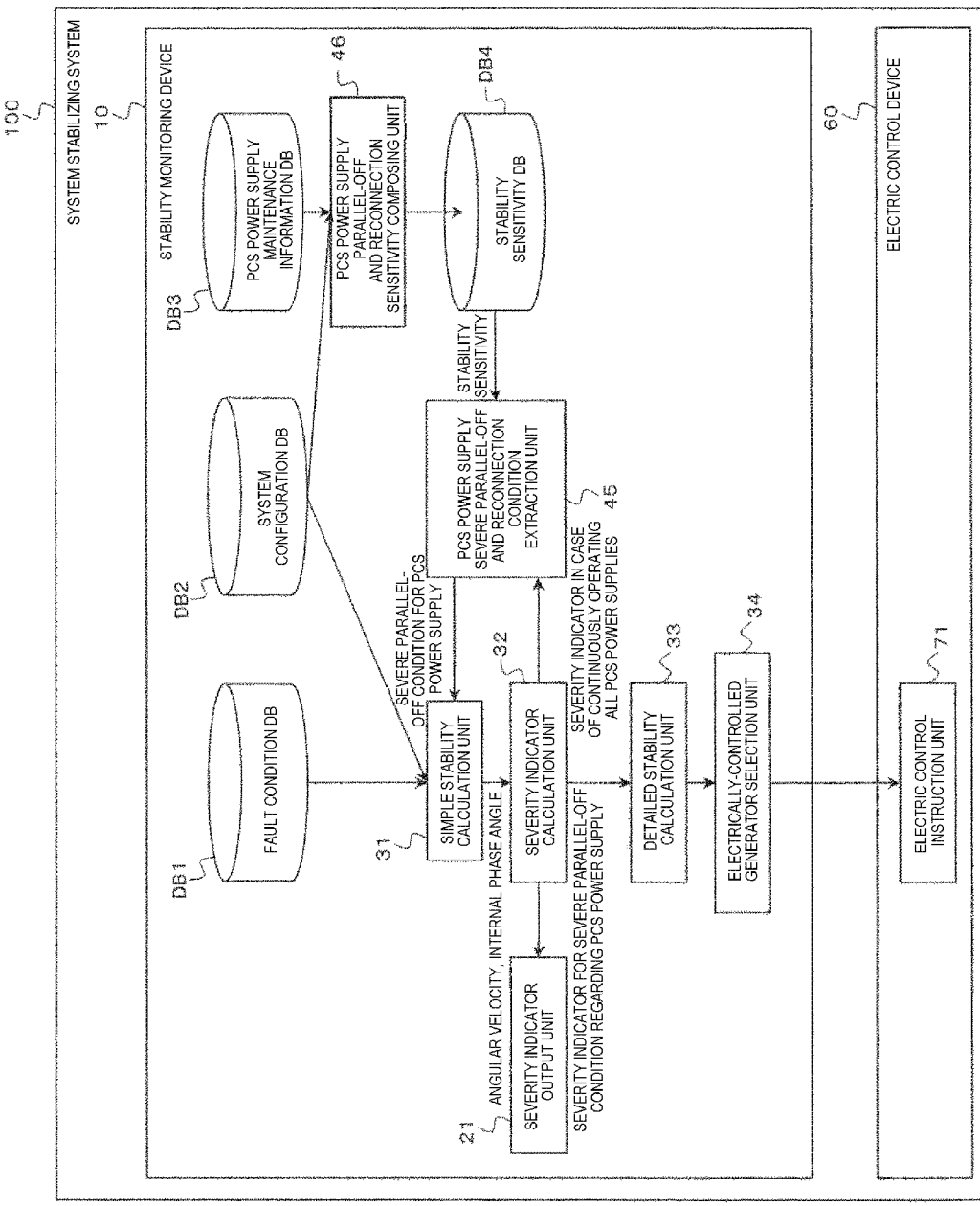
FIG. 27 is a diagram showing an example of a software configuration of a stability monitoring device in which parallel-off and reconnection are taken into account.

A stability monitoring device 10 according to the fifth embodiment shown in FIG. 27 differs from that of the first embodiment that the PCS power supply severe parallel-off condition extracting unit 41 is replaced by a PCS power supply severe parallel-off and reconnection condition extraction unit 45 and the PCS power supply severe parallel-off sensitivity composing unit 42 is replaced by a PCS power supply parallel-off and reconnection sensitivity composing unit 46. It has the effect of shortening the calculation period by grasping the timings of the moments of parallel-off and reconnection at which stability is severe and narrowing down the cases only to combinations with which stability becomes severe.

In the PCS power supply severe parallel-off condition extracting unit 45, in addition to the function of extracting a pattern having a large degree of influence on the internal phase angle of a generator with respect to the parallel-off of a PCS power supply, by taking into account the presence/absence of parallel-off and reconnection and the timings of the moments of the parallel-off and reconnection, a pattern having a large degree of influence on the internal phase angle is extracted. Since the timings of the moments of parallel-off and reconnection are countless, there is a problem that the number of fault cases increases. However, by taking only the timing at which the degree of influence on the internal phase angle is large into account, the number of fault cases can be narrowed down. The timings of parallel-off and reconnection of a PCS power supply are determined by referring to frequency deviations and a phase angular velocity of a generator. For example, when a PCS power supply is paralleled off, the parallel-off decelerates a generator, and thus the PCS is stepped out at the timing when the generator is decelerated.

Figure 28:
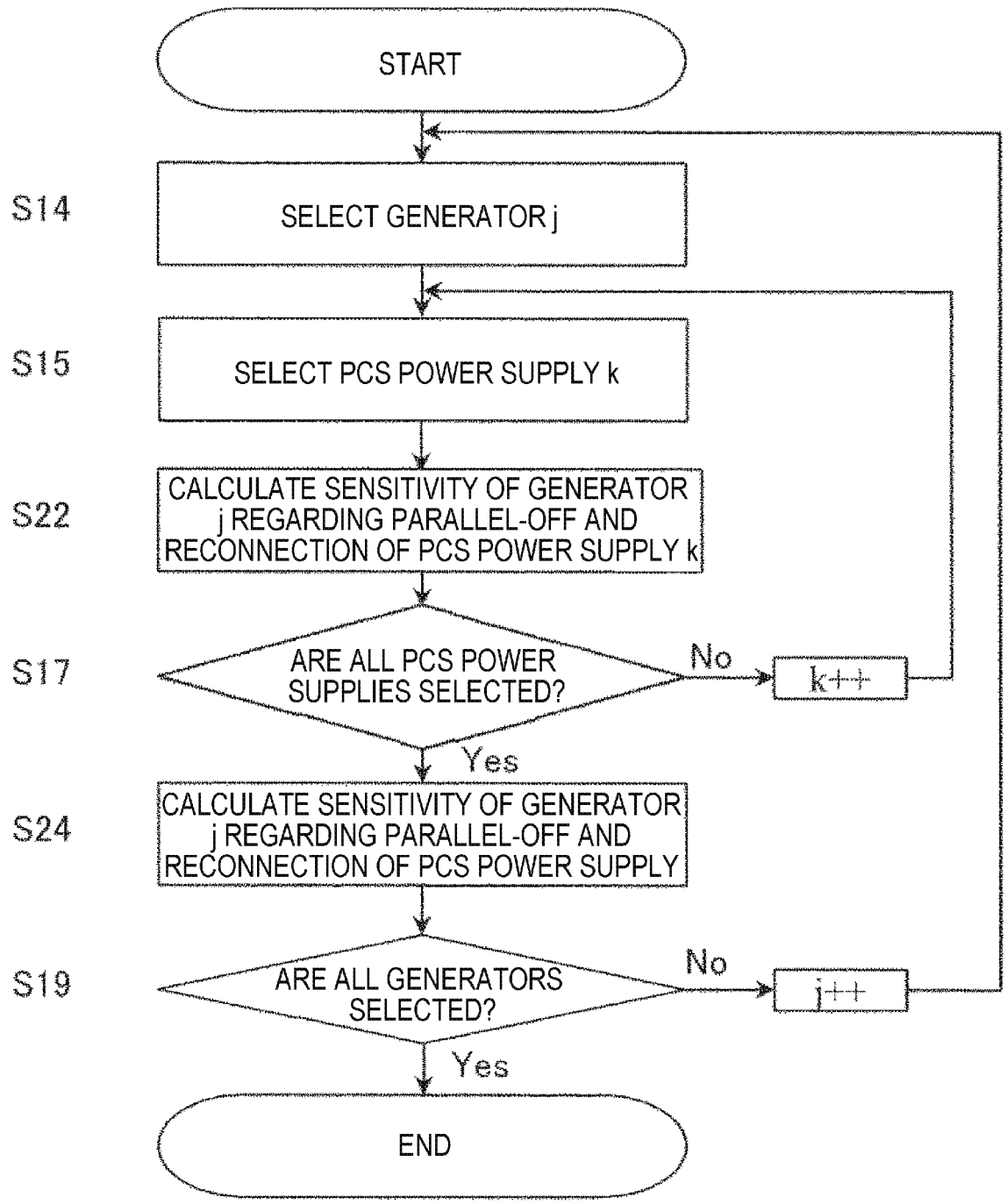
FIG. 28 is a flowchart showing an example of the overall processes of the stability monitoring device in which parallel-off and reconnection are taken into account.
Figure 29:
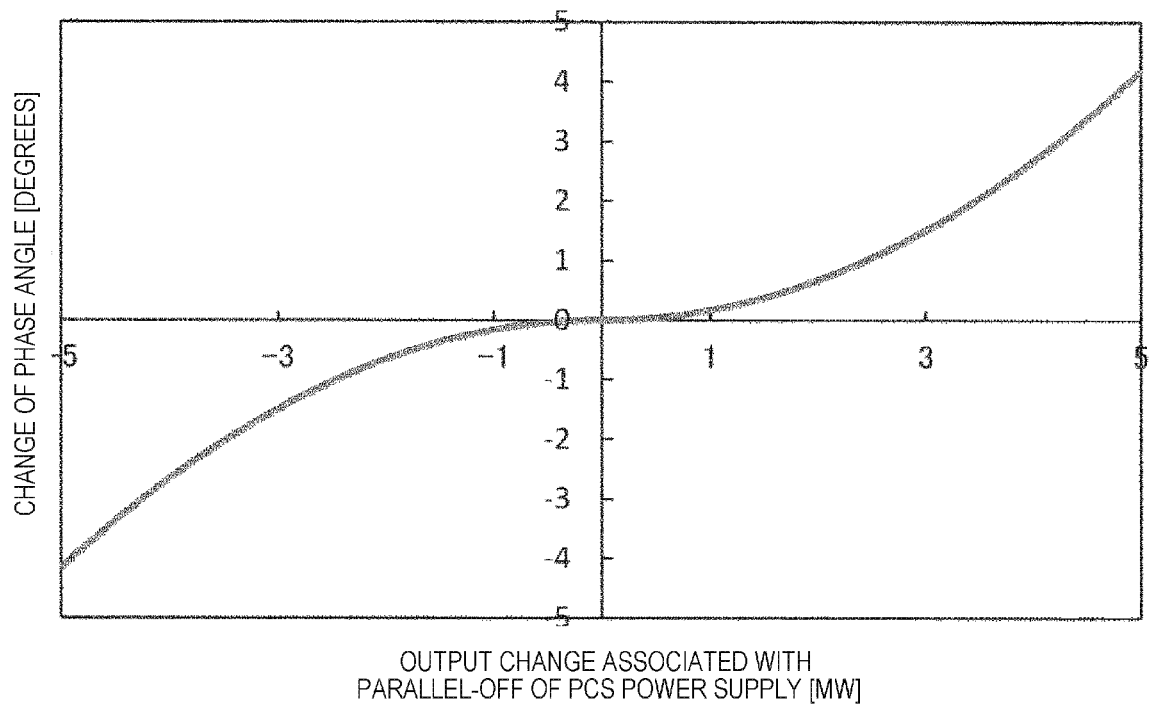
FIG. 29 is an example of a preliminary operation table showing a parallel-off and reconnection sensitivity indicator that represents a degree of influence of parallel-off and reconnection of one PCS power supply on the internal phase angle of a generator.
Figure 30:
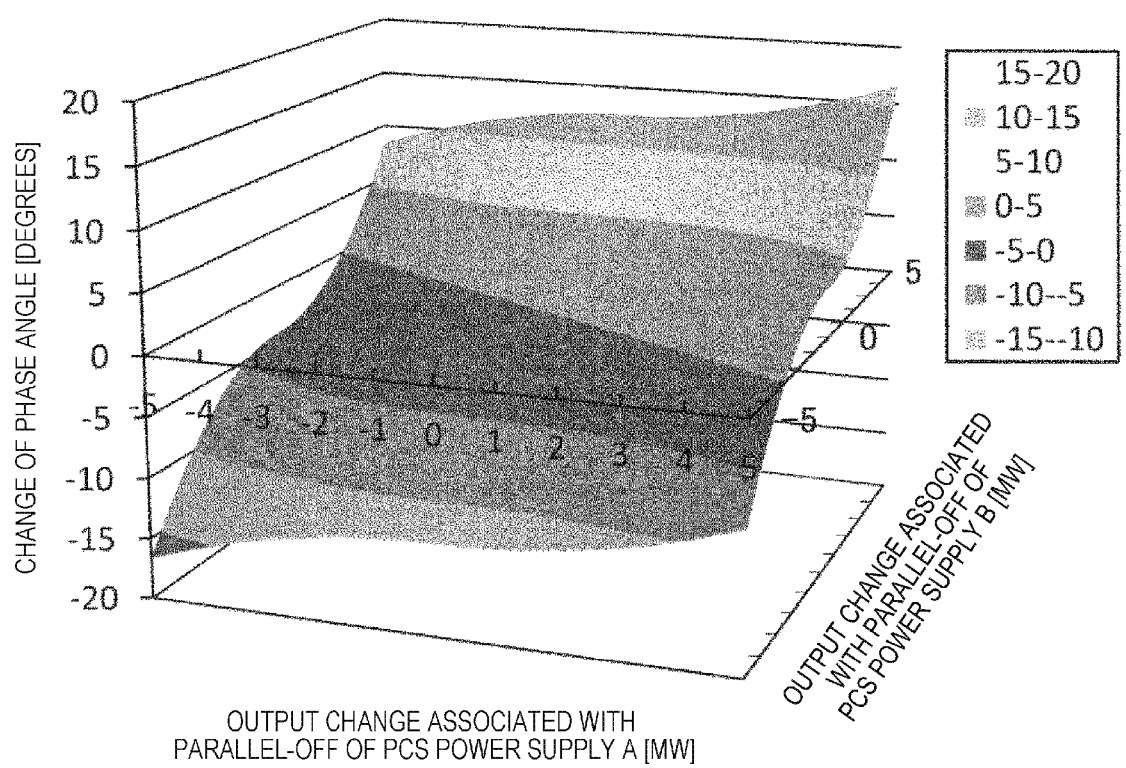
FIG. 30 is an example of a preliminary operation table showing a parallel-off and reconnection sensitivity indicator that represents a degree of influence of parallel-off and reconnection of two PCS power supplies on the internal phase angle of a generator.

In the PCS power supply parallel-off and reconnection sensitivity composing unit 46, in addition to the configuration in which a degree of influence on the internal phase angle of a generator with respect to parallel-off of the PCS power supply is stored in the stability sensitivity database DB4, presence and/or absence of parallel-off and reconnection and a degree of influence of timings thereof on the internal phase angle of a generator are also stored in the stability sensitivity database DB4, thereby extracting a severity pattern. FIG. 28 is a flowchart showing an example of a process for composing a PCS power supply parallel-off sensitivity. In the process step 22, which is a difference from the first embodiment, a parallel-off and reconnection sensitivity indicator y representing a degree of influence of the output change of the PCS power supply k on the internal phase angle of the generator j is calculated. As shown in FIG. 29, a preliminary table in which the horizontal axis represents output changes associated with parallel-off of a PCS power supply and the vertical axis represents a relationship between internal phase angle changes of a generator and output changes of the PCS power supply is composed. In addition, in the process step S24, which is a difference from the first embodiment, the parallel-off and reconnection sensitivity indicator y representing a degree of influence of the output changes of a plurality of PCS power supplies on the internal phase angle of the generator j is calculated. FIG. 30 is a diagram showing an example of a system in which two PCS power supplies A and B are connected, for example. A preliminary table in which the horizontal axis represents output changes associated with the parallel-off of the PCS power supply A, the depth axis represents output changes associated with the parallel-off of the PCS power supply B, and the vertical axis represents a relationship between internal phase angle changes of a generator and output changes of the PCS power supplies is composed. A preliminary table regarding a system in which three or more PCS power supplies are connected is also composed in the same way.

An example of severity indicator rankings is shown in FIG. 31. Rankings are allocated by taking fault points and the parallel-off and reconnection timing of each PCS power supply into account.

According to the fifth embodiment, it has the effect of shortening the calculation period by grasping the timings of the moments of parallel-off and reconnection at which stability is severe and narrowing down the cases to combinations with which stability becomes severe.

REFERENCE SIGNS LIST

10 stability monitoring device
11 display unit
12 input unit
13 communication unit
14 CPU
15 memory
21 severity indicator output unit
31 simple stability calculation unit
32 severity indicator calculation unit
33 detailed stability calculation unit
34 electric control instruction unit
41 PCS power supply severe parallel-off condition extracting unit
42 PCS power supply parallel-off sensitivity composing unit
43 PCS power supply parallel-off pattern extraction unit (see fault point and installation point of PCS power supply)
44 PCS power supply parallel-off pattern extraction unit (see to fault voltage)
45 PCS power supply severe parallel-off and reconnection condition extraction unit
46 PCS power supply parallel-off and reconnection sensitivity composing unit
51 bus line
60 electric control device
71 electric control instruction unit
100 system stabilizing system
110 node
120 transformer
140 thermal power generation
140 power transmission line
150 PCS power supply
160 load
170 system fault point
DB1 fault condition database
DB2 system configuration database
DB3 PCS power supply maintenance information database
DB4 stability sensitivity database

The invention claimed is:

1. A device for controlling production of power in a power system to mitigate a deterioration of transient stability, the device comprising:
   a memory;
   a communication interface; and
   a processor that is communicatively coupled to the memory and the communication interface,
   wherein the processor is configured to:
   receive, using the communication interface, fault conditions and a system configuration of the power system;
   calculate an angular velocity and an internal phase angle of a generator in each fault case based on the fault conditions and the system configuration of the power system;
   calculate a severity indicator representing a degree of system instability based on the angular velocity and the internal phase angle of the generator;
   calculate a parallel-off severity indicator for a paralleling off a distributed power supply (PCS power supply) based on a parallel-off sensitivity indicator representing a degree of influence of parallel-off of the PCS power supply on a degree of instability of a generator and the severity indicator,
   extract fault cases corresponding to the parallel-off severity indicator exceeding a prescribed threshold;
   perform a detailed stability calculation for each extracted fault case based on the severity indicator or the parallel-off severity indicator, and
   control the production of the power in the power system to mitigate the deterioration of the transient stability based on the detailed stability calculation for each extracted fault case.

2. The device according to claim 1, wherein the memory includes:
   a fault condition database that stores fault conditions including fault locations and fault modes; and
   a system configuration database that stores the system configurations including lines, generators, and PCS power supplies.

3. The device according to claim 1, wherein the control the production of the power in the power system to mitigate the deterioration of transient stability incudes:
   selecting at least one of a power supply control and a load control for a fault case determined as being unstable through the detailed stability calculation.

4. The device according to claim 1, wherein the processor is further configured to:
   composes a preliminary table related to the parallel-off sensitivity indicator for an active PCS power supply every time data related to maintenance is updated.

5. The device according to claim 1, wherein the processor is further configured to,
   Determine that a PCS power supply corresponding to an electrical distance between a fault point of the power system and the PCS power supply equal to or greater than a prescribed threshold is not paralleled off and extracts a parallel-off pattern by excluding the parallel-off case of the PCS power supply.

6. The device according to claim 1, wherein the processor is further configured to:
   store, as a preliminary table, a parallel-off and reconnection sensitivity indicator representing a degree of influence of the parallel-off and the reconnection of the PCS power supply on a degree of instability of a generator,
   calculate a parallel-off and reconnection severity indicator of the PCS power supply based on the severity indicator and the parallel-off and reconnection sensitivity indicator, and
   extract the fault cases corresponding to the parallel-off and reconnection severity indicator exceeding a prescribed threshold.

7. The device according to claim 6, wherein the processor is further configured to:
   extract parallel-off and reconnection timings at which the parallel-off and reconnection severity indicator increases based on a frequency deviation and a phase angular velocity of a generator.

8. The device according to claim 1, wherein the processor is further configured to:
   compose a preliminary table related to the parallel-off and reconnection sensitivity representing a degree of influence of an output change at the times of parallel-off and reconnection on the internal phase angle of a generator for an active PCS power supply every time the data related to maintenance is updated.

9. The device according to claim 1, wherein the processor is further configured to:
   extract a parallel-off timing at which the parallel-off severity indicator increases based on a frequency deviation and a phase angular velocity of a generator.

10. A method for controlling production of power in a power system to mitigate a deterioration of transient stability, the method comprising:
    receiving fault conditions and a system configuration of the power system;
    calculating an angular velocity and an internal phase angle of a generator in each fault case based on the fault conditions and the system configuration of the power system;
    calculating a severity indicator representing a degree of system instability based on the angular velocity and the internal phase angle of the generator;
    calculating a parallel-off severity indicator for a paralleling off a distributed power supply (PCS power supply) based on a parallel-off sensitivity indicator representing a degree of influence of parallel-off of the PCS power supply on a degree of instability of a generator and the severity indicator, and extracting fault cases corresponding to the parallel-off severity indicator exceeding a prescribed threshold;
    performing a detailed stability calculation for each extracted fault case based on the severity indicator or the parallel-off severity indicator; and
    controlling the production of the power in the power system to mitigate the deterioration of the transient stability based on the detailed stability calculation for each extracted fault case.

* * * * *